United States Patent
Teshirogi et al.

(10) Patent No.: US 7,200,324 B2
(45) Date of Patent: Apr. 3, 2007

(54) MAGNETIC-TAPE RECORDING APPARATUS AND METHOD, MAGNETIC-TAPE REPRODUCTION APPARATUS AND METHOD, AND RECORDING MEDIUM

(75) Inventors: Hidehiko Teshirogi, Kanagawa (JP); Keita Nakamatsu, Kanagawa (JP); Takaya Yamamura, Kanagawa (JP); Yasutaka Kotani, Tokyo (JP); Fumiyoshi Abe, Kanagawa (JP); Tsukasa Hashino, Kanagawa (JP)

(73) Assignee: Sony Corporation, Tokyo (JP)

( * ) Notice: Subject to any disclaimer, the term of this patent is extended or adjusted under 35 U.S.C. 154(b) by 1065 days.

(21) Appl. No.: 09/821,321

(22) Filed: Mar. 29, 2001

(65) Prior Publication Data

US 2001/0043785 A1 Nov. 22, 2001

(30) Foreign Application Priority Data

Mar. 30, 2000 (JP) .............................. 2000-093896

(51) Int. Cl.
*H04N 5/91* (2006.01)
(52) U.S. Cl. ....................................... 386/95; 386/112
(58) Field of Classification Search ................. 386/46, 386/95, 96, 111, 112, 124, 67, 103
See application file for complete search history.

(56) References Cited

U.S. PATENT DOCUMENTS

| | | | | |
|---|---|---|---|---|
| 5,574,570 A | * | 11/1996 | Ohkuma et al. | ............ 386/103 |
| 5,940,016 A | * | 8/1999 | Lee | ............... 341/67 |
| 6,026,212 A | * | 2/2000 | Oguro | .......... 386/67 |
| 6,115,537 A | * | 9/2000 | Yamada et al. | ............. 386/109 |
| 6,421,091 B1 | * | 7/2002 | Kawakami et al. | ......... 348/473 |
| 6,658,195 B1 | * | 12/2003 | Senshu et al. | ................ 386/54 |

* cited by examiner

*Primary Examiner*—Huy Nguyen
(74) *Attorney, Agent, or Firm*—Frommer Lawrence & Haug LLP; William S. Frommer

(57) ABSTRACT

A magnetic-tape recording apparatus records digital data on a magnetic tape by a rotating head. It includes a first obtaining device for obtaining predetermined-unit video data; a second obtaining device for obtaining audio data corresponding to the predetermined-unit video data; a synthesizing device for synthesizing the predetermined-unit video data and the audio data corresponding to the predetermined-unit video data such that they are continuous on a track in the magnetic tape without any space disposed therebetween; and a sending device for sending data synthesized by the synthesizing device to the rotating head in order to record the data on the magnetic tape.

16 Claims, 17 Drawing Sheets

FIG. 21

| $APT_2$ | $APT_1$ | $APT_0$ | MEANING |
|---|---|---|---|
| 0 | 0 | 0 | CONSUMER DIGITAL VCR |
| 0 | 0 | 1 | RESERVED |
| 0 | 1 | 0 | RESERVED |
| 0 | 1 | 1 | RESERVED |
| 1 | 0 | 0 | RESERVED |
| 1 | 0 | 1 | RESERVED |
| 1 | 1 | 0 | RESERVED |
| 1 | 1 | 1 | NO INFORMATION |

MAGNETIC-TAPE RECORDING APPARATUS AND METHOD, MAGNETIC-TAPE REPRODUCTION APPARATUS AND METHOD, AND RECORDING MEDIUM

BACKGROUND OF THE INVENTION

1. Field of the Invention

The present invention relates to magnetic-tape recording apparatuses and methods, magnetic-tape reproduction apparatuses and methods, and recording media, and more particularly, to a magnetic-tape recording apparatus, a magnetic-tape recording method, a magnetic-tape reproduction apparatus, a magnetic-tape reproduction method, and a recording medium which allow high-quality video data to be recorded into and reproduced from a magnetic tape and to be efficiently edited.

2. Description of the Related Art

Compression technologies have been advancing these days. Video data is compressed, for example, by a Digital Video (DV) method and recorded into a magnetic tape.

To record high-quality video data (hereinafter called high-definition (HD) video data), for example, a bit rate of about 25 Mbps is required. In a conventional recording method, the video rate corresponding to an MP@HL Moving Picture Expert Group (MPEG) method is at most about 24 Mbps except for the rate of search-image data. As a result, standard-quality video data (hereinafter called standard-definition (SD) video data) can be recorded, but it is impossible to compress and record HD video data by the MP@HL or an MP@H-14 method.

In addition, HD video data compressed by the MP@HL or MP@H-14 method cannot be efficiently tied to that compressed by the MP@HL or MP@H-14 method.

SUMMARY OF THE INVENTION

The present invention has been made in consideration of the above conditions. Accordingly, it is an object of the present invention to allow HD video data to be recorded and reproduced, and to be efficiently edited.

The foregoing object is achieved in one aspect of the present invention through the provision of a magnetic-tape recording apparatus for recording digital data on a magnetic tape by a rotating head, including first obtaining means for obtaining predetermined-unit video data; second obtaining means for obtaining audio data corresponding to the predetermined-unit video data; synthesizing means for synthesizing the predetermined-unit video data and the audio data corresponding to the predetermined-unit video data such that they are continuous on a track in the magnetic tape without any space disposed therebetween; and sending means for sending data synthesized by the synthesizing means to the rotating head in order to record the data on the magnetic tape.

The magnetic-tape recording apparatus may be configured such that compression means for compressing the high-quality video data obtained by the first obtaining means is further included; the first obtaining means obtains, as the video data, high quality video data; and the predetermined-unit video data is the data of pictures whose number is indicated by the value of M in a GOP structure.

The compression means may compress the high-quality video data by an MP@HL or MP@H-14 method.

The magnetic-tape recording apparatus may be configured such that third obtaining means for obtaining, as the video data, compressed standard video data is further included; the high-quality video data obtained by the first obtaining means includes distinguish information for distinguishing the high-quality video data from the standard video data; and the synthesizing means selects the high-quality video data compressed by the compression means or the compressed standard video data obtained by the third obtaining means and synthesizes.

The foregoing object is achieved in another aspect of the present invention through the provision of a magnetic-tape recording method for a magnetic-tape recording apparatus for recording digital data on a magnetic tape by a rotating head, including a first obtaining step of obtaining predetermined-unit video data; a second obtaining step of obtaining audio data corresponding to the predetermined-unit video data; a synthesizing step of synthesizing the predetermined-unit video data and the audio data corresponding to the predetermined-unit video data such that they are continuous on a track in the magnetic tape without any space disposed therebetween; and a sending step of sending data synthesized by a process in the synthesizing step to the rotating head in order to record the data on the magnetic tape.

The foregoing object is achieved in still another aspect of the present invention through the provision of a recording medium for recording a computer-readable program which controls a magnetic-tape recording apparatus for recording digital data on a magnetic tape by a rotating head, the program including a first obtaining step of obtaining predetermined-unit video data; a second obtaining step of obtaining audio data corresponding to the predetermined-unit video data; a synthesizing step of synthesizing the predetermined-unit video data and the audio data corresponding to the predetermined-unit video data such that they are continuous on a track in the magnetic tape without any space disposed therebetween; and a sending step of sending data synthesized by a process in the synthesizing step to the rotating head in order to record the data on the magnetic tape.

In a magnetic-tape recording apparatus, a magnetic-tape recording method, and a program stored in a recording medium of the present invention, predetermined-unit video data is taken, the audio data corresponding to the predetermined-unit video data is taken, the predetermined-unit video data and the audio data corresponding to the predetermined-unit video data are synthesized such that they are continuous on a track in a magnetic tape without any space disposed therebetween, and synthesized data is recorded into the magnetic tape.

The foregoing object is achieved in yet aspect of the present invention through the provision of a magnetic-tape reproduction apparatus for reading by a rotating head a magnetic tape into which compressed, high-quality or standard, predetermined-unit, video data and audio data corresponding to the predetermined-unit video data are recorded such that they are continuous on a track without any space disposed therebetween, including first decompression means for decompressing the compressed, high-quality video data among data read from the magnetic tape by the rotating head; second decompression means for decompressing the compressed audio data among the data read from the magnetic tape by the rotating head; detecting means for detecting distinguish information for distinguishing the video data from the audio data, from the data read from the magnetic tape by the rotating head; and selection means for selecting the first decompression means or the second decompression means according to the result of detection performed by the detecting means to process the data read from the magnetic tape by the rotating head.

The first decompression means may decompress the high-quality video data by an MP@HL or MP@H-14 method.

The foregoing object is achieved in a further aspect of the present invention through the provision of a magnetic-tape reproduction method for a magnetic-tape reproduction apparatus for reading by a rotating head a magnetic tape into which compressed, high-quality or standard, predetermined-unit, video data and audio data corresponding to the predetermined-unit video data are recorded such that they are continuous on a track without any space disposed therebetween, including a first decompression step of decompressing the compressed, high-quality video data among data read from the magnetic tape by the rotating head; a second decompression step of decompressing the compressed audio data among the data read from the magnetic tape by the rotating head; a detecting step of detecting distinguish information for distinguishing the video data from the audio data, from the data read from the magnetic tape by the rotating head; and a selection step of selecting a process performed in the first decompression step or in the second decompression step according to the result of detection performed in the detecting step to process the data read from the magnetic tape by the rotating head.

The foregoing object is achieved in a still further aspect of the present invention through the provision of a recording medium for recording a computer-readable program which controls a magnetic-tape reproduction apparatus for reading by a rotating head a magnetic tape into which compressed, high-quality or standard, predetermined-unit, video data and audio data corresponding to the predetermined-unit video data are recorded such that they are continuous on a track without any space disposed therebetween, the program including a first decompression step of decompressing the compressed, high-quality video data among data read from the magnetic tape by the rotating head; a second decompression step of decompressing the compressed audio data among the data read from the magnetic tape by the rotating head; a detecting step of detecting distinguish information for distinguishing the video data from the audio data among the data read from the magnetic tape by the rotating head; and a selection step of selecting a process performed in the first decompression step or in the second decompression step according to the result of detection performed in the detecting step to process the data read from the magnetic tape by the rotating head.

In a magnetic-tape reproduction apparatus, a magnetic-tape reproduction method, and a program stored in a recording medium of the present invention, compressed high-quality video data is decompressed among data read by a rotating head from a magnetic tape, compressed audio data is decompressed among the data read by the rotating head from the magnetic tape, distinguish information for distinguishing the video data from the audio data is detected among the data read by the rotating head from the magnetic tape, decompression processing is selected according to the result of detection, and the data read from the magnetic tape by the rotating head is processed.

BRIEF DESCRIPTION OF THE DRAWINGS

FIG. 21 is a view showing the structure of TIA shown in FIG. 14.

DESCRIPTION OF THE PREFERRED EMBODIMENTS

Figure 1:
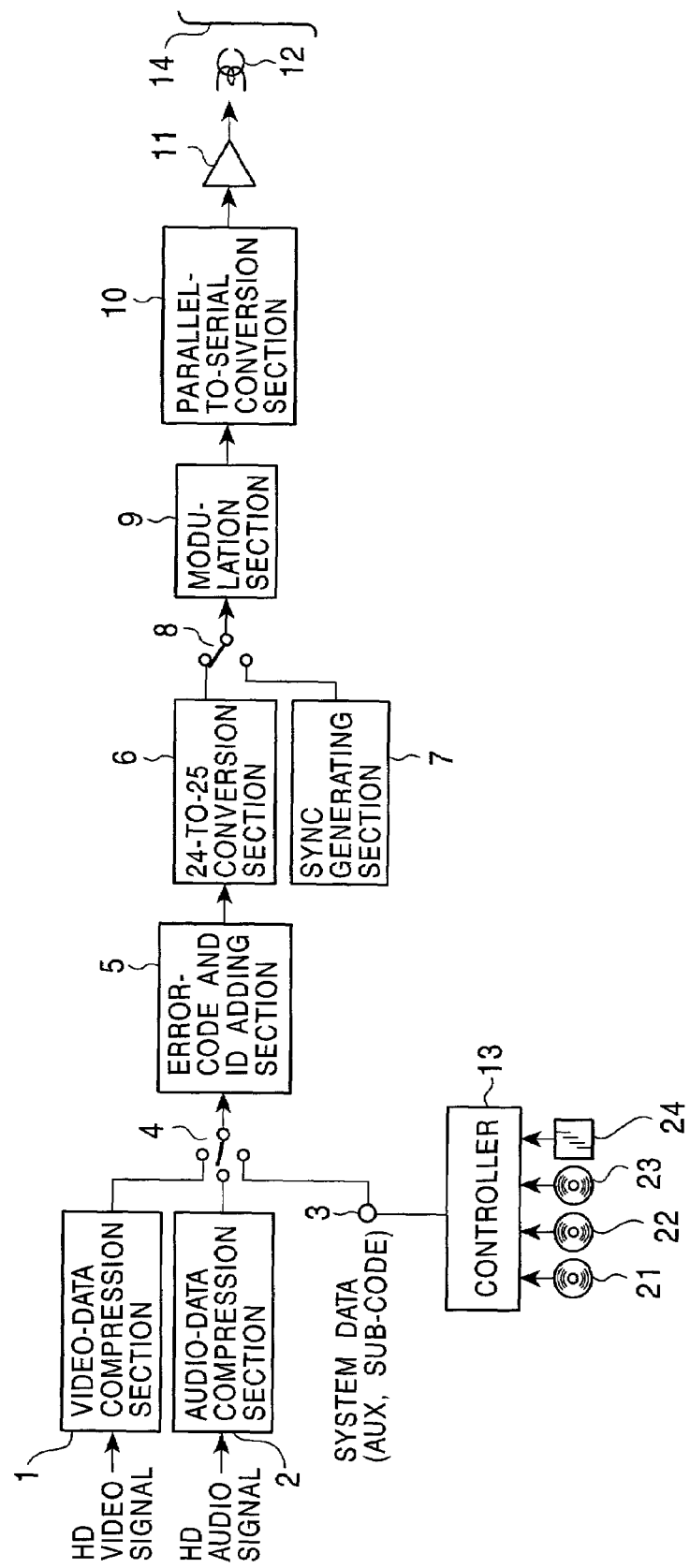
FIG. 1 is a block diagram showing an example structure of a recording system of a magnetic-tape recording and reproduction apparatus to which the present invention is applied.

FIG. 1 shows an example structure of a recording system of a magnetic-tape recording and reproduction apparatus to which the present invention is applied. A video-data compression section 1 compresses an input HD video signal by an MPEG method, such as an MP@HL or MP@H-14 method. An audio-data compression section 2 compresses the audio signal corresponding to the HD video signal, for example, by a method corresponding to the MPEG2-ACC audio compression method. A controller 13 inputs system data formed of auxiliary (AUX) data, sub-code data, and others to a terminal 3.

A switch 4 is switched by the controller 13 to appropriately select the output of the video-data compression section 1, the output of the audio-data compression section 2, or the system data input from the terminal 3 at a predetermined timing and to send it to an error-code and ID adding section 5.

The error-code and ID adding section 5 adds an error detecting and correcting code or an ID to data input through the switch 4, applies interleaving processing to 16 tracks, and outputs to a 24-to-25 conversion section 6.

The 24-to-25 conversion section 6 adds one redundant bit selected so as to enhance a pilot signal for tracking to convert data input in units of 24 bits to 25-bit data.

A sync generating section 7 generates sync data to be added to main data (FIG. 8) or to a sub-code data (FIG. 9), described later, and generates amble data.

A switch 8 is controlled by the controller 13 to select the output of the 24-to-25 conversion section 6 or the output of the sync generating section 7 and to output to a modulation section 9. The modulation section 9 randomizes data input through the switch 8 such that "1" or "0" does not continue, modulates it by a method (the same method as for a DV format) appropriate for recording into a magnetic tape 14, and outputs to a parallel-to-serial (P/S) conversion section 10.

The parallel-to-serial conversion section 10 converts input data from parallel data to serial data. An amplifier 11 amplifies data input from the parallel-to-serial conversion section 10, and sends it to a rotating head 12 mounted to a rotating drum (not shown) and rotated, to record into the magnetic tape 14.

Figure 2:
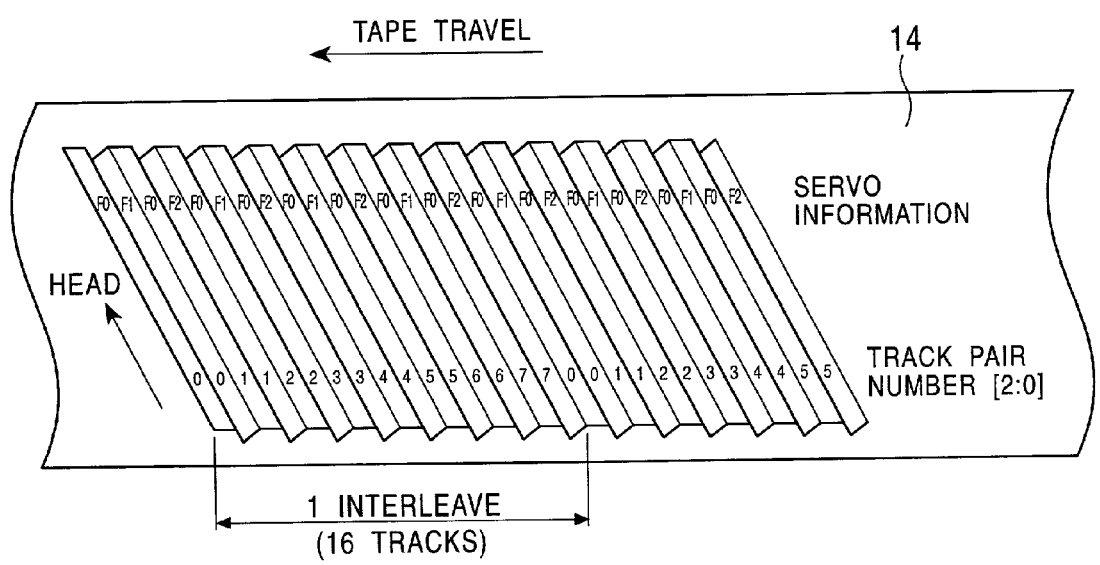
FIG. 2 is a view showing the track format of a magnetic tape shown in FIG. 1.

FIG. 2 shows the format of tracks formed by the rotating head 12 on the magnetic tape 14. The rotating head 12 traces on the magnetic tape 14 in the direction from the bottom right to the top left in the figure to form tracks at an angle against the longitudinal direction of the magnetic tape 14. The magnetic tape 14 is moved in the direction from the right to the left in the figure.

Each track is F0, F1, or F2 according to the type of a pilot signal recorded therein for tracking control. Tracks are formed in the order of F0, F1, F0, F2, F0, F1, F0, and F2.

Figure 3:
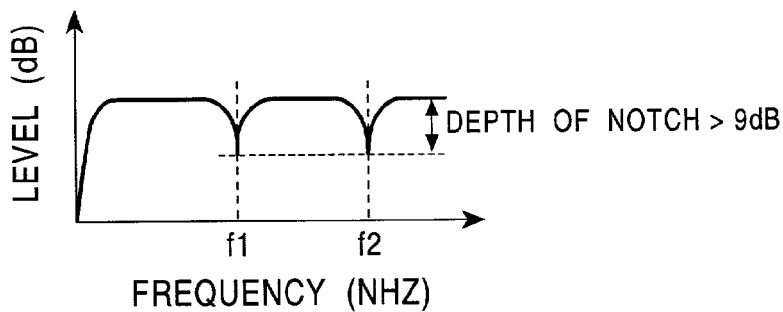
FIG. 3 is a view related to a pilot signal for tracking, recorded into a track shown in FIG. 2.
Figure 4:
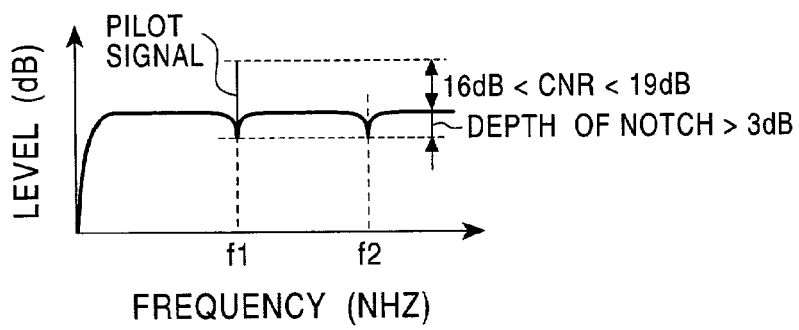
FIG. 4 is a view showing a pilot signal for tracking, recorded into a track shown in FIG. 2.
Figure 5:
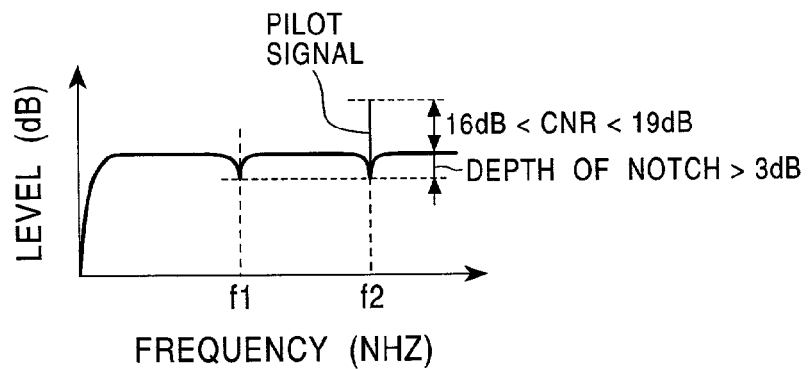
FIG. 5 is a view showing a pilot signal for tracking, recorded into a track shown in FIG. 2.

In a track F0, as shown in FIG. 3, neither a pilot signal having a frequency of f1 nor that having a frequency of f2 is recorded. In contrast, a pilot signal having a frequency of f1 is recorded in a track F1, as shown in FIG. 4, and a pilot signal having a frequency of f2 is recorded in a track F2, as shown in FIG. 5.

The frequencies f1 and f2 are 1/90 and 1/60 of the recording frequency of a channel bit, respectively.

As shown in FIG. 3, notch sections at the frequencies f1 and f2 in a track F0 have a depth of 9 dB. The carrier-to-noise ratio (CNR) of a pilot signal having a frequency of f1 or f2 is larger than 16 dB and smaller than 19 dB. A notch section at the frequency f1 or f2 in the corresponding track has a depth of larger than 3 dB. With these settings, when the head scans a track F0, a pilot signal leaking from an adjacent track (track F1 or track F2) is easily detected. As a result, a tape speed is positively controlled such that the magnitude of a leaking pilot signal is made constant.

A track pattern having these frequency characteristics is the same as that in the DV format. Therefore, a magnetic tape, a rotating head, a driving system, a demodulation system, and a control system for commercial digital video tape recorders can be used in the present embodiment as they are.

Figures 6, 7:
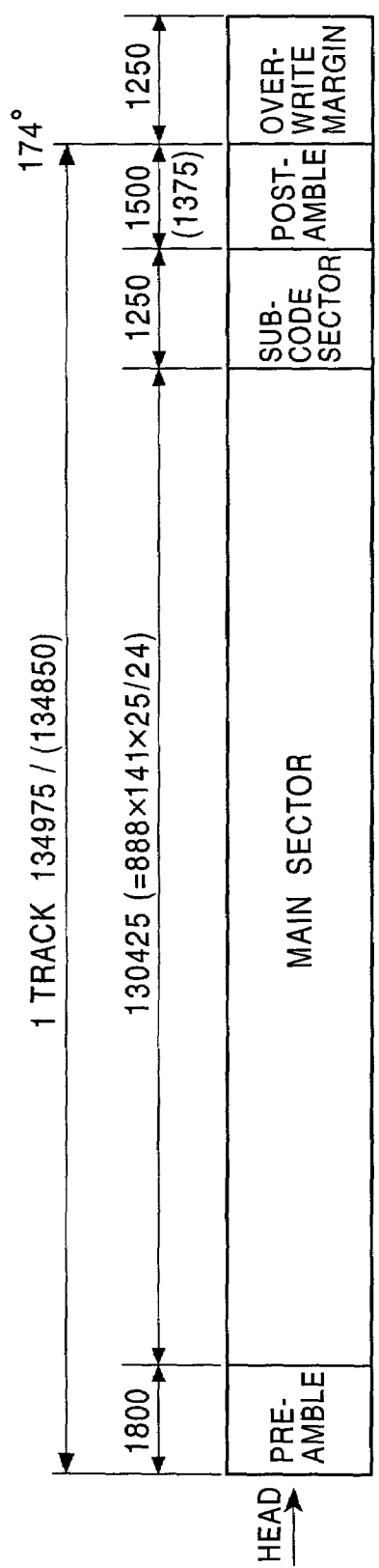
FIG. 6 is a view showing a sector arrangement in a track shown in FIG. 2.
FIG. 7 is a view showing the patterns of a pre-amble and a post-amble shown in FIG. 6.

FIG. 6 shows an example sector arrangement of each track. In FIG. 6, the number of bits indicates the length of each part obtained after the 24-to-25 conversion. The length of one track is 134,975 bits when the rotating head 12 is rotated at a frequency of 60×1000/1001 Hz, and is 134,850 bits when the rotating head 12 is rotated at 60 Hz. The length of one track corresponds to a wrapping angle of 174 degrees of the magnetic tape 14. An overwrite margin 1250 bits long is formed after a track to prevent deletion missing.

In FIG. 6, the rotating head 12 traces on a track in the direction from the left to the right. At the beginning, a preamble 1,800 bits long is formed. In this preamble, data required to generate a clock, such as that obtained by combining a pattern A and a pattern B shown in FIG. 7, is recorded. The pattern A has a 0-and-1 pattern reversed to that of the pattern B. Tracking patterns for tracks F0, F1, and F2 are made by appropriately combining the patterns. Specifically, the difference between the number of 0's and that of 1's is periodically changed in the patterns to generate tracking signals.

Figure 8:
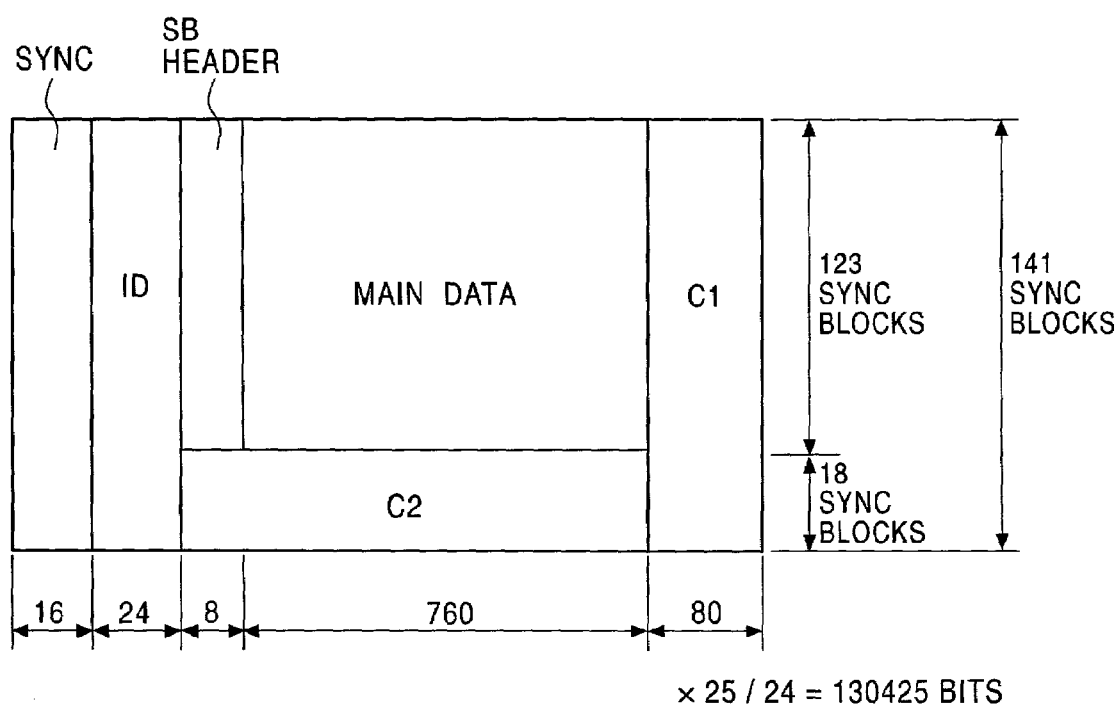
FIG. 8 is a view illustrating the structure of a main sector shown in FIG. 6.

After the preamble having 1,800 bits, a main sector 130,425 bits long is disposed. FIG. 8 shows the structure of the main sector.

As shown in the figure, the main sector is formed of 141 sync blocks. Each sync block is 888 bits (111 bytes) long.

In each of the first 123 sync blocks, a 16-bit sync, a 24-bit ID, an 8-bit SB header, 760-bit main data, and a 80-bit parity C1 are disposed.

The sync is generated by the sync generating section 7. The ID is added by the error-code and ID adding section 5. The SB header includes identification information for identifying the type of the main data, such as audio data, video data, search video data, transport-stream data, and AUX data. The controller 13 sends SB-header data through the terminal 3 as system data.

The main data is video data sent from the video-data compression section 1, audio data sent from the audio-data compression section 2, or AUX data sent from the controller 13 through the terminal 3.

The parity C1 is calculated by using the ID, the SB header, and the main data in each sync block and added by the error-code and ID adding section 5.

Each of the last 18 sync blocks among the 141 sync blocks includes a sync, an ID, a parity C2, and a parity C1. The parity C2 is obtained by calculating the SB headers or the main data in the vertical direction in FIG. 8. This calculation is performed by the error-code and ID adding section 5.

The total amount of data in the main sector is 888 bits×141 sync blocks=125,208 bits. The total amount of data is 130,425 bits after the 24-to-25 conversion. The substantial maximum data rate is 760 bits×123 sync blocks×10 tracks× 30 Hz=28.044 MHz at 60 Hz. This bit rate is sufficient for recording HD video data, compressed audio data, AUX data and search video data by the MP@HL or MP@H-14 method.

Figure 9:
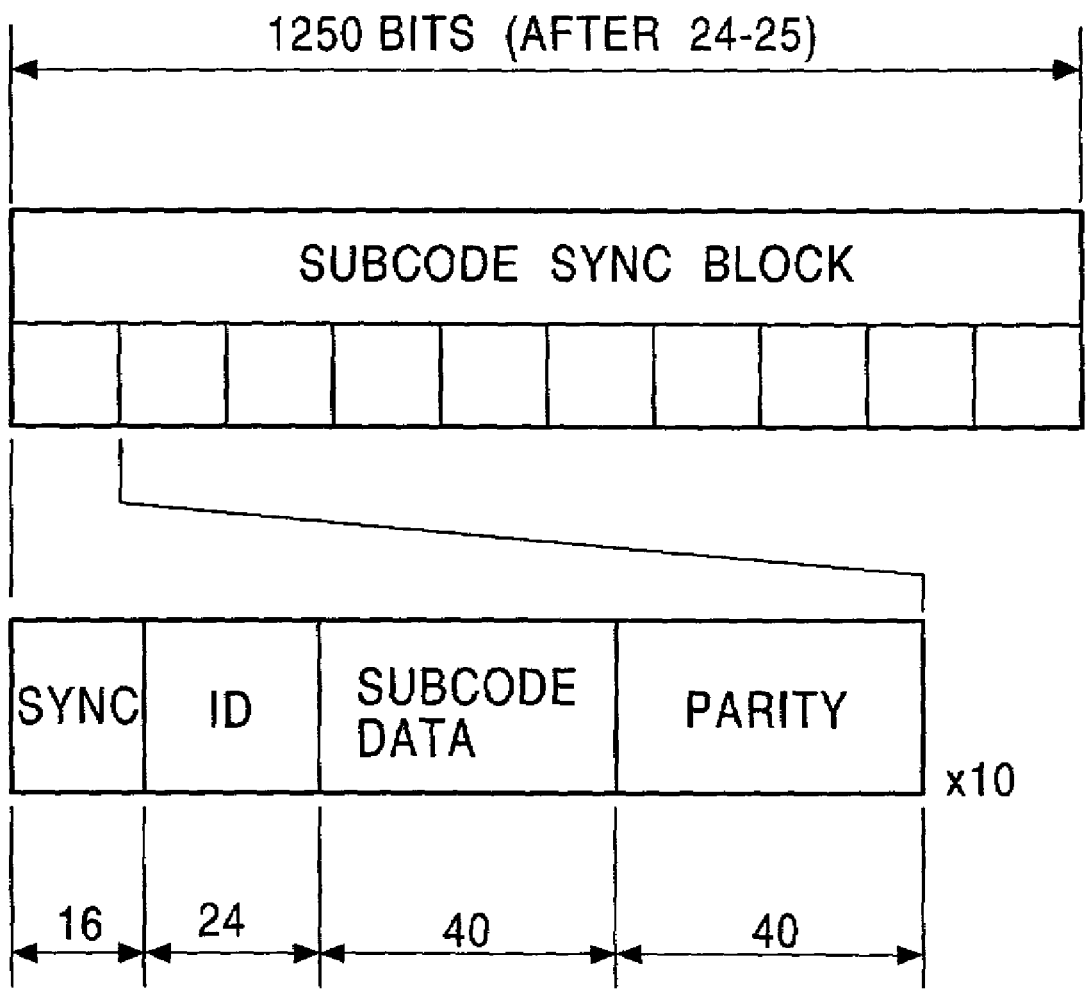
FIG. 9 is a view illustrating the structure of a sub-code sector shown in FIG. 6.

After the main sector, a sub-code sector 1250 bits long is disposed. FIG. 9 shows the structure of the sub-code sector.

The sub-code sector in one track is formed of 10 sub-code sync blocks. One sub-code sync block is formed of a sync, an ID, sub-code data, and a parity.

At the beginning of the sub-code sector 1250 bits long (after the 24-to-25 conversion) shown in FIG. 9, a 16-bit sync is disposed. A 24-bit ID is disposed thereafter. The sync is added by the sync generating section 7. The ID is added by the error-code and ID adding section 5.

After the ID code, 40-bit sub-code data is disposed. This sub-code data is sent from the controller 13 through the terminal 3, and includes, for example, a track number and a time code. After the sub-code data, a 40-bit parity is added. The parity is added by the error-code and ID adding section 5.

A sub-code sync block has the length (120 bits) before the 24-to-25 conversion.

After the sub-code sector, a post amble is disposed. The post amble is also recorded by combining the pattern A and the pattern B shown in FIG. 7. Its length is 1500 bits when a synchronization is achieved at 60×1000/1001 Hz, and is 1375 bits when a synchronization is achieved at 60 Hz.

The operation of the apparatus shown in FIG. 1 will be described next. An HD video signal is input to the video-data compression section 1, and compressed, for example, by the MP@HL or MP@H-14 method.

Figure 10:
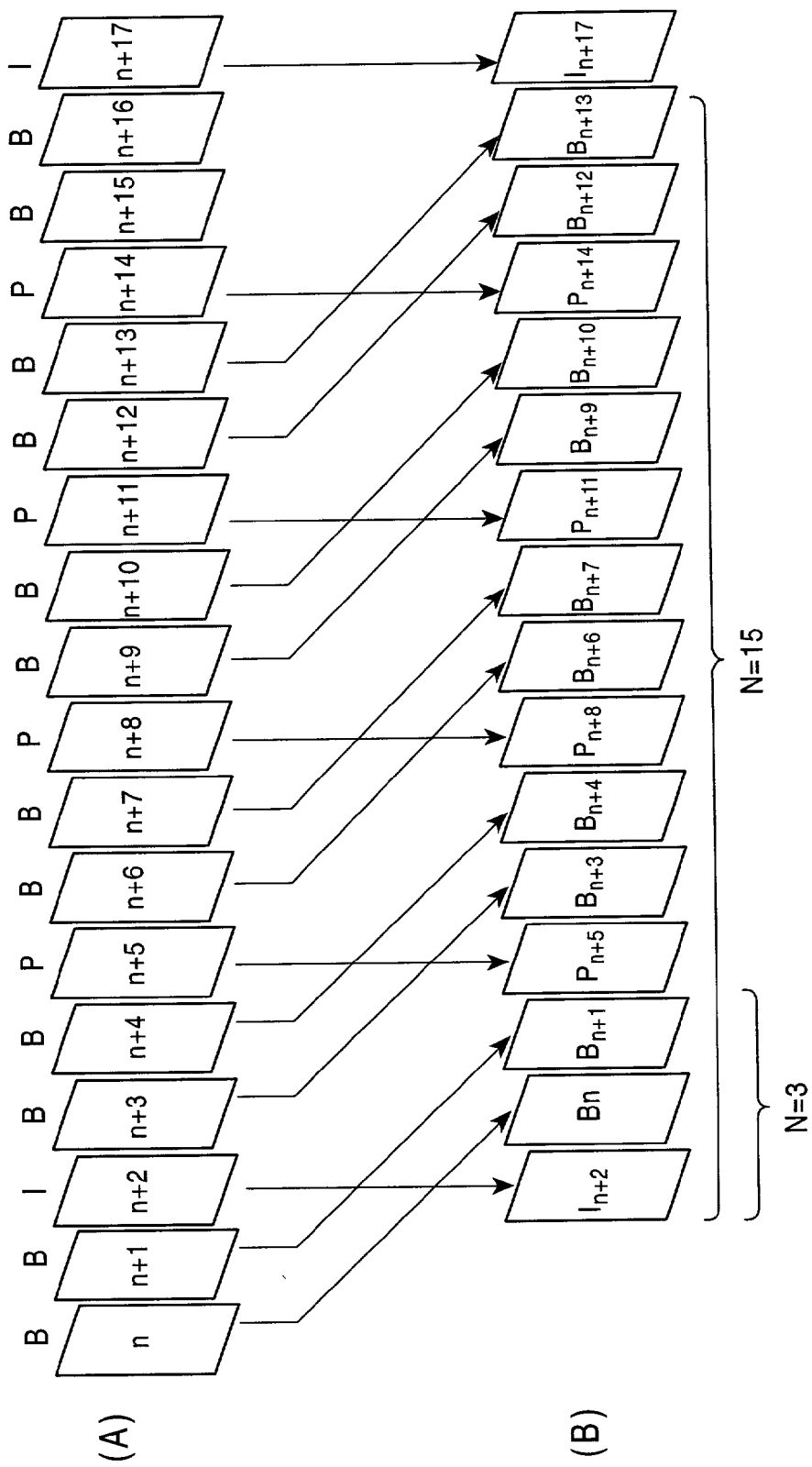
FIG. 10 is a view showing an encoding process applied to video data.

For example, frames for which picture types are specified as shown in FIG. 10(A), constituting an HD video are re-arranged in order to ease encoding processing in a bi-directional prediction, and are encoded as shown in FIG. 10(B) correspondingly to the specified picture types. The input HD video signal is compressed by the video-data compression section 1 in this way to generate video data (hereinafter called video data having a GOP structure of N=15 and M=3, if necessary) in which I (intra) pictures are disposed every 15 pictures (N=15) and P (predictive) pictures are disposed every three pictures (M=3).

Figure 11A:
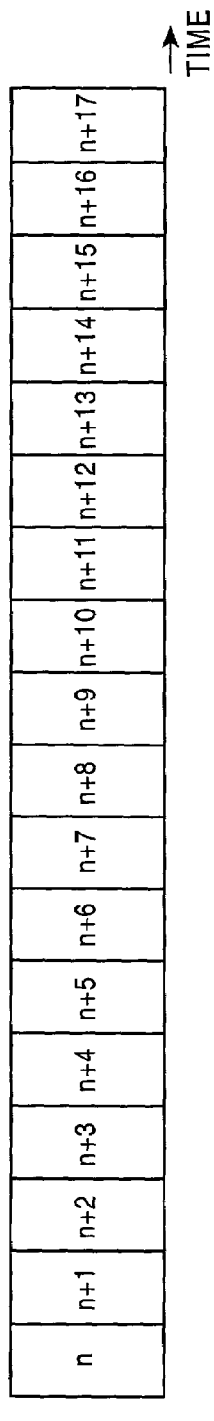
FIG. 11A and FIG. 11B are views showing the amounts of codes in pictures.

The amount of data in each frame shown in FIG. 10(A) is the same. For example, as shown in FIG. 11A, when the horizontal direction indicates time and the vertical direction indicates a bit rate in the figure, each frame is expressed by a block having the same height and width (having the same area).

Since a frame having a picture type of I picture is encoded within the frame, a frame having a picture type of P picture is prediction-encoded in a forward direction (uni-direction), and a frame having a picture type of B (bi-directional predictive) picture is prediction-encoded bi-directionally, the amount of codes in each picture shown in FIG. 10(B) is different. I pictures have the largest amount of codes, P pictures next, and then, B pictures. When the horizontal direction indicates time and the vertical direction indicates a bit rate as shown in FIG. 11B, since each picture is compressed by the MPEG method so as to have the same bit rate, each picture is expressed by a block having the same height and a different width corresponding to its amount of codes.

Figure 11B:
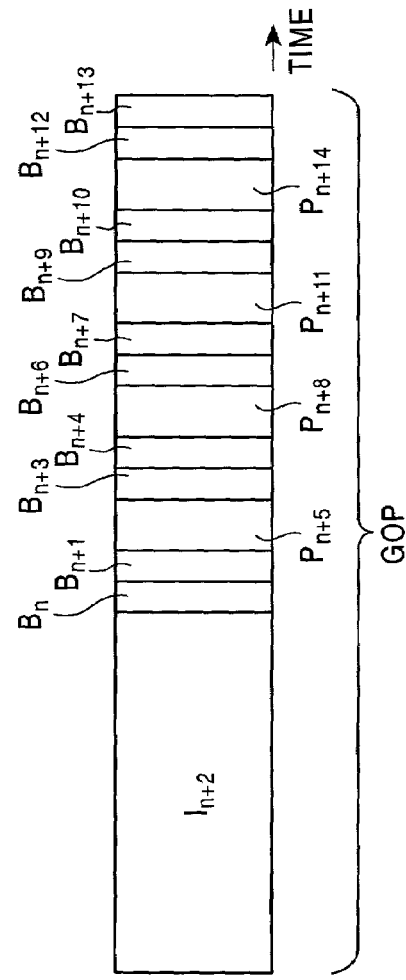

Although it appears in FIG. 11B that all P pictures have the same size (same amount of codes) and all B pictures have the same size, they actually have different amounts of codes according to the videos of their frames, such as image patterns in the videos. The larger the correlation with the video of a frame with which a prediction relationship is obtained is, the smaller the amount of codes is. Even if the same encoding processing is applied, the amounts of codes are different.

An HD audio signal is input to the audio-data compression section 2, and compressed by the same method as for the DV format. The HD audio signals corresponding to HD video signals have the same amount of data, and also have the same amount of codes after the compression.

The controller 13 sends system data formed of sub-code data, AUX data, and an SB header to the terminal 3.

The switch 4 is controlled by the controller 13 to appropriately select the output video data (including search video data) of the video-data compression section 1, the output auto data of the audio-data compression section 2, or the system data input from the terminal 3, at a predetermined timing and to send it to the error-code and ID adding section 5 to synthesize data.

In this case, data sent to the error-code and ID adding section 5 is synthesized such that pictures the number of which is indicated by the value of M in a GOP structure are handled as a unit, and one-unit pictures (video data) and the audio data corresponding to the pictures are collectively arranged.

In the case shown in FIG. 11B, since the value of M in a GOP structure is three, three pictures are handled as a unit.

An I picture $I_{n+2}$, a B picture $B_n$, and a B picture $B_{n+1}$, a P picture $P_{n+5}$, a B picture $B_{n+3}$, and a B picture $B_{n+4}$, a P picture $P_{n+8}$, a B picture $B_{n+6}$, and a B picture $B_{n+7}$, a P picture $P_{n+11}$, a B picture $B_{n+9}$, and a B picture $B_{n+10}$, and a P picture $P_{n+14}$, a B picture $B_{n+12}$, and a B picture $B_{n+13}$, are each handled as one-unit pictures.

Figure 12:
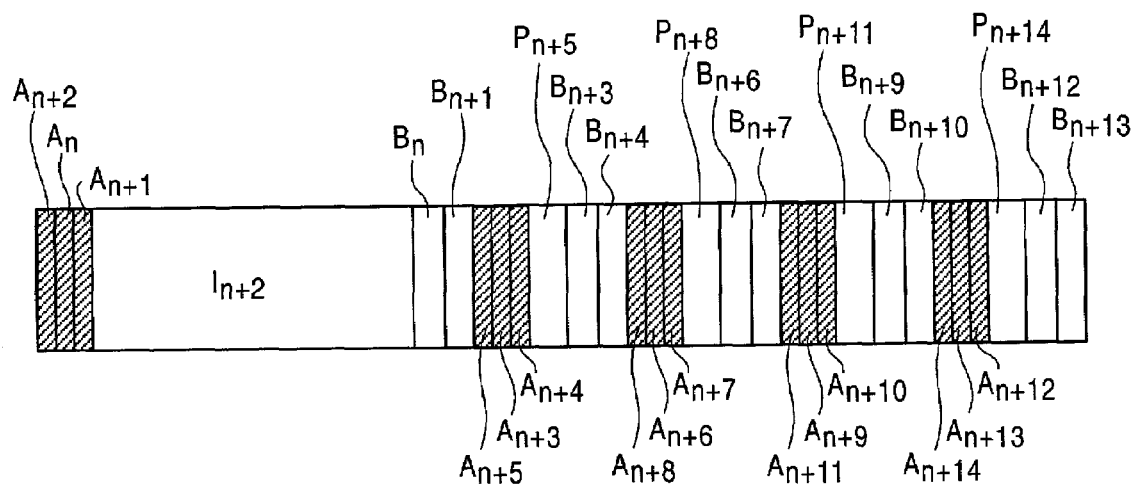
FIG. 12 is a view showing a data synthesizing process.

As shown FIG. 12, one-unit video data (pictures) is continuously arranged, and the corresponding audio data is also continuously arranged before the video data. For example, audio data $A_{n+2}$, audio data $A_n$, and audio data $A_{n+1}$, corresponding to the I picture $I_{n+2}$, the B picture $B_n$, and the B picture $B_{n+1}$ are continuously arranged, and following them, the I picture $I_{n+2}$, the B picture $B_n$, and the B picture $B_{n+1}$ are continuously arranged.

In FIG. 12, $A_{n+2}$, $A_n$, and $A_{n+1}$ indicate the audio data corresponding to the I picture $I_{n+2}$, the B picture $B_n$, and the B picture $B_{n+1}$, $A_{n+5}$, $A_{n+3}$, and $A_{n+4}$ indicate the audio data corresponding to the P picture $P_{n+5}$, the B picture $B_{n+3}$, and the B picture $B_{n+4}$, $A_{n+8}$, $A_{n+6}$, and $A_{+7}$ indicate the audio data corresponding to the P picture $P_{n+8}$, the B picture $B_{n+6}$, and the B picture $B_{n+7}$, $A_{n+11}$, $A_{n+9}$, and $A_{n+10}$ indicate the audio data corresponding to the P picture $P_{n+11}$, the B picture $B_{n+9}$, and the B picture $B_{n+10}$, and $A_{+14}$, $A_{n+13}$, and $A_{n+12}$ indicate the audio data corresponding to the P picture $P_{n+14}$, the B picture $B_{n+12}$, and the B picture $B_{n+13}$.

The error-code and ID adding section 5 holds data synthesized as described above for 16 tracks and interleaves the data within the 16 tracks.

The error-code and ID adding section 5 adds a 24-bit ID to each sync block shown in FIG. 8 in the main sector. The error-code and ID adding section 5 also calculates and adds a parity C1 shown in FIG. 8 for and to each sync block, and adds a parity C2 to each of the last 18 sync blocks among the 141 sync blocks, instead of the SB header and main data.

In addition, as shown in FIG. 9, the error-code and ID adding section 5 adds a 24-bit ID to each sub-code sync block in the sub-code sector, and calculates and adds a 40-bit parity.

The 24-to-25 conversion section 6 converts data sent from the error-code and ID adding section 5 in units of 24 bits to 25-bit data. With this conversion, the pilot signals for tracking having frequencies of f1 and f2, shown in FIG. 3 to FIG. 5, have large magnitudes.

The sync generating section 7 adds a 16-bit synchronizing data (sync) to each sync block in the main sector, as shown in FIG. 8. The sync generating section 7 also adds 16-bit synchronizing data (sync) to each sub-code sync block in the sub-code sector, as shown in FIG. 9. In addition, the sync generating section 7 generates a run pattern for a pre-amble or a post-amble shown in FIG. 7.

More specifically, the foregoing data is added (synthesized) when the controller 13 switches the switch 8 to selectively send the data output from the sync generating section 7 and the data output from the 24-to-25 conversion section 6 to the modulation section 9.

The modulation section 9 randomizes input data, modulates it by a method corresponding to the DV format, and outputs to the parallel-to-serial conversion section 10. The parallel-to-serial conversion section 10 converts input data from parallel data to serial data, and sends it to the rotating head 12 through the amplifier 11. The rotating head 12 records input data into the magnetic tape 14.

Figure 13:
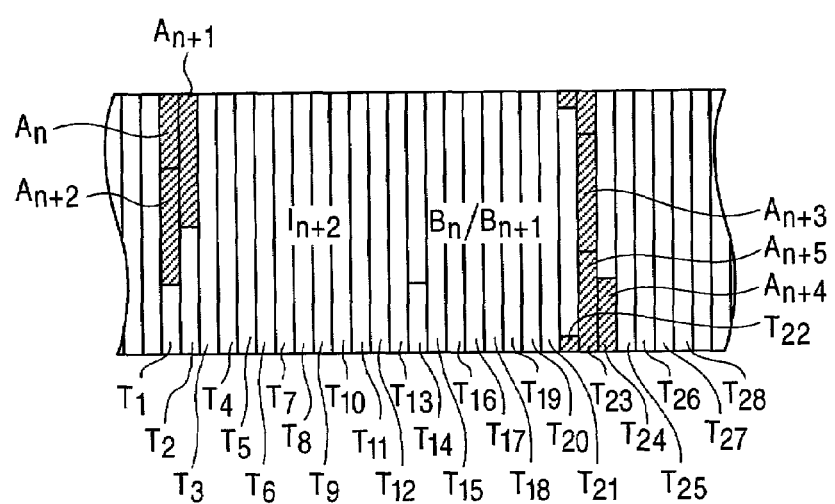
FIG. 13 is a view showing data recorded into a magnetic tape.

FIG. 13 shows a condition in which data which includes the audio data $A_{n+2}$ to the B picture $B_{n+1}$ among the data synthesized as shown in FIG. 12 is recorded into the magnetic tape 14. Specifically, for example, the audio data $A_{n+1}$ and the I picture $I_{n+2}$ are both recorded in a track T2.

In FIG. 13, tracks formed at an angle against the longitudinal direction of the magnetic tape 14 are vertically shown.

As described above, since data is synthesized such that predetermined-unit video data and the corresponding audio data are respectively collectively arranged, the data is recorded in the format having the sector arrangement shown in FIG. 6, and a video rate of about 28 Mbps is obtained. In other words, HD video data is compressed and recorded by the MP@HL or MP@H-14 method.

Figure 14:
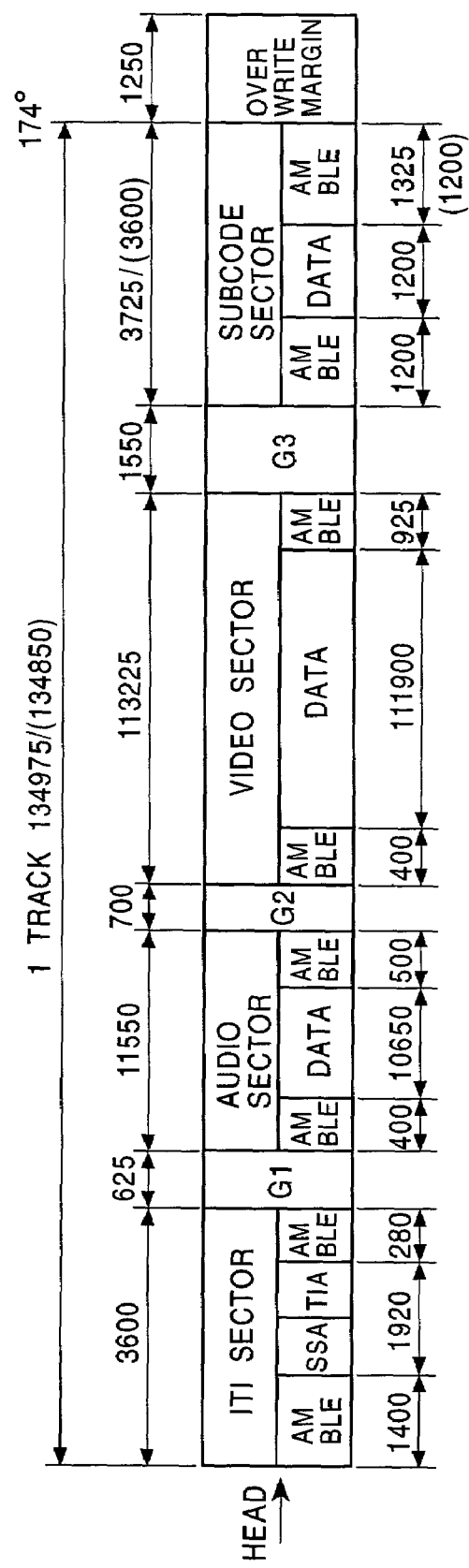
FIG. 14 is a view showing the structure of track sectors in the DV format.

Conventionally, as shown in FIG. 14, since data is recorded in the DV format, in which a gap G1 (625 bits), a gap G2 (700 bits), and a gap G3 (1550 bits) are arranged in addition to an audio sector having an audio signal and a video sector having video data, only a video rate of about 24 Mbps is at most obtained except that for search video data.

Figure 15:
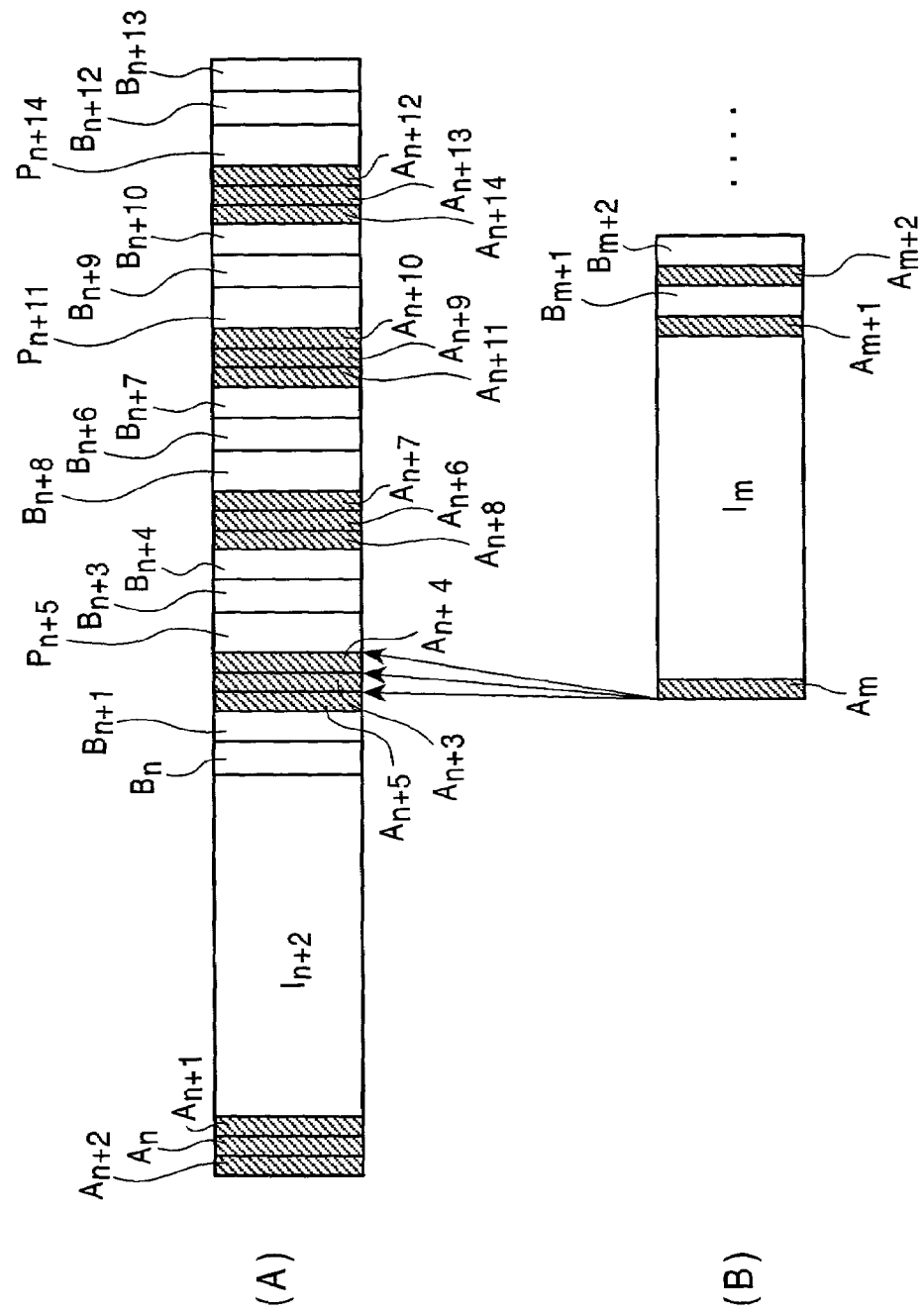
FIG. 15 is a view showing a video tying process.

Since an HD video signal and an HD audio signal are collectively recorded in predetermined units as shown in FIG. 13, recorded HD video data can be efficiently tied, for example, to other HD video data recorded by the MP@HL or MP@H-14 method. The principle therefor will be described next by referring to FIG. 15.

FIG. 15(A) imitatively shows an HD video signal and an HD audio signal (recorded data) recorded by the MP@HL or MP@H-14 method as shown in FIG. 13 (FIG. 15(A) is substantially the same as FIG. 12).

FIG. 15(B) imitatively shows an HD video signal and an HD audio signal formed by the MP@HL or MP@H-14 method, separately sent, in other words, normal MPEG data to which the processing of the present invention has not been applied. In MPEG data, audio data and the corresponding video data (picture) are alternately arranged.

It is assumed here that the recorded data (FIG. 15(A)) serves as under-recorded data, the normal MPEG data serves as data to be tied, and the B picture $B_{n+1}$ of the recorded data and an I picture $I_m$ of the MPEG data are to be tied. In this case, audio data $A_m$ of the MPEG data is disposed immediately after the audio data $A_{n+5}$ of the recorded data, immediately after the audio data $A_{n+3}$, or immediately after the audio data $A_{n+4}$. With this operation, without including wasteful video data, the audio signal corresponding to a copy picture is obtained for tying data.

The first video data of the data tied to under-recorded data is usually an I picture (in this case, the I picture $I_m$) Since an I picture has a larger amount of codes than a P picture and a B picture, as described above, a decoding buffer generates an underflow or an overflow when the I picture is decoded according to the amount of codes of the video data (in this case, the B picture $B_{n+1}$) of the under-recorded data, decoded immediately before the I picture of the tied data. To prevent the decoding buffer from generating an underflow or an overflow, a still picture having an extremely small amount of codes, a so-called copy picture is inserted at the tying point as video data of the under-recorded data, decoded immediately before the I picture of the tied data.

When a copy picture is inserted in this way, however, since a display time is extended by the amount thereof, data to be tied is tied after the audio signal of the under-recorded data which continues before the tying point to ensure the audio data corresponding to the copy picture. Specifically, in this case, data to be tied is tied such that the audio data $A_{n+5}$, the audio data $A_{n+3}$, or the audio data $A_{n+4}$ of the recorded data serving as under-recorded data serves as the audio data corresponding to the copy picture.

Figure 16:
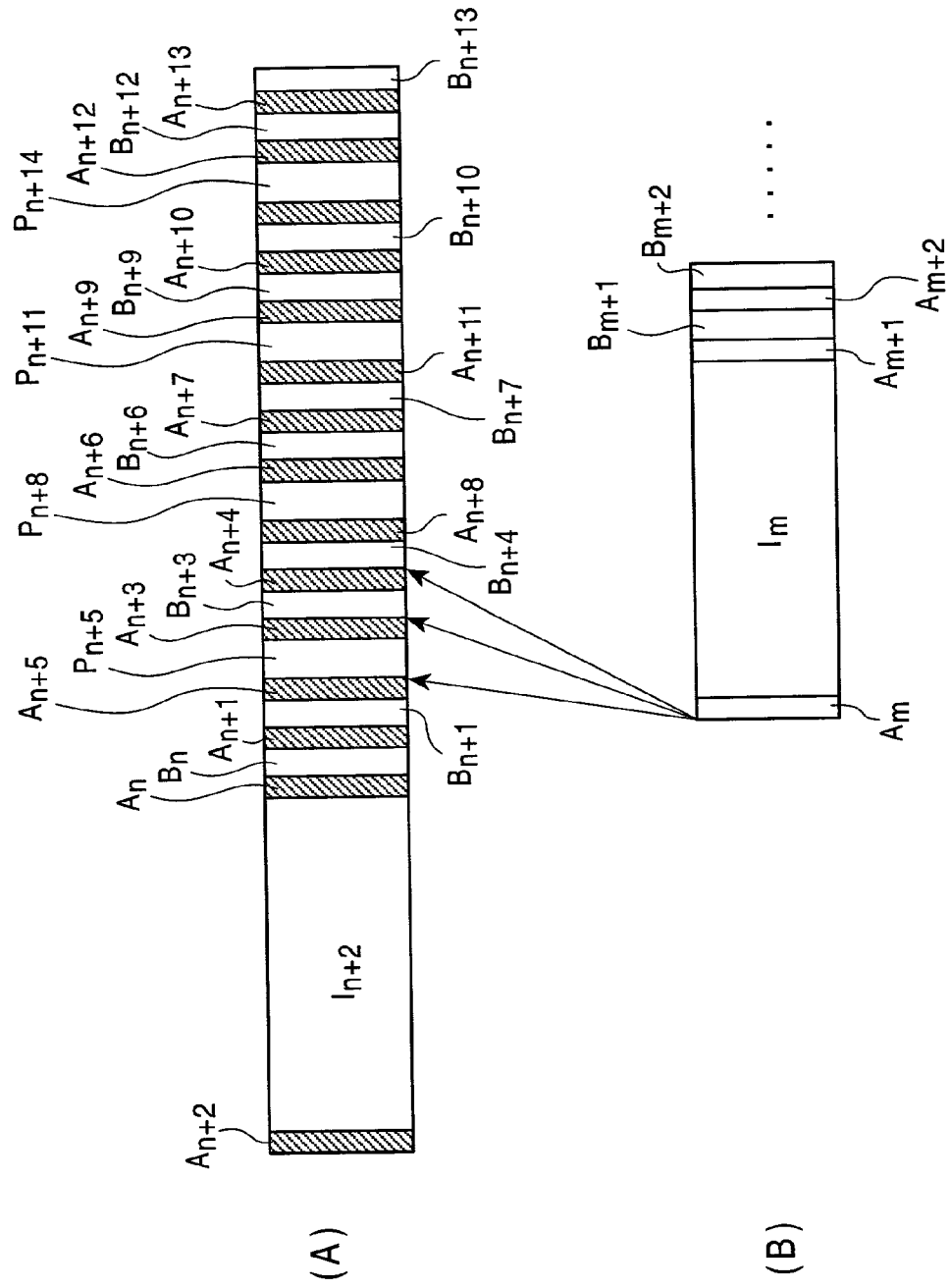
FIG. 16 is a view showing a video tying process.

Conventionally, since an HD video signal and an HD audio signal formed by the MP@HL or MP@H-14 method are recorded in the same data arrangement as that of MPEG data as shown in FIG. 16(A), in other words, since an audio signal and the corresponding video signal are alternately arranged and recorded, when they are tied to other MPEG data, a wasteful video signal is included.

When a B picture $B_{n+1}$ in recorded data (data recorded by a conventional recording method) shown in FIG. 16(A) is tied to an I picture $I_m$ of MPEG data shown in FIG. 16(B), for example, the I picture $I_m$ shown in FIG. 16(B) is tied immediately after audio data $A_{n+5}$, immediately after audio data $A_{n+3}$, or immediately after audio data $A_{n+4}$ shown in FIG. 16(A).

In this case, when the I picture $I_m$ is tied immediately after the audio data $A_{n+3}$ shown in FIG. 16(A), a P picture $P_{n+5}$ is included. When the I picture $I_m$ is tied immediately after the audio data $A_{n+4}$, a P picture $P_{n+5}$ and a B picture $B_{n+3}$ are both included. Consequently, wasteful video data is included.

In the foregoing description, an HD video signal and an HD audio signal which have not been compressed by an MPEG method are used as input signals. An HD video signal and an HD audio signal which have been compressed by an MPEG method can be used as input signals.

Figure 17:
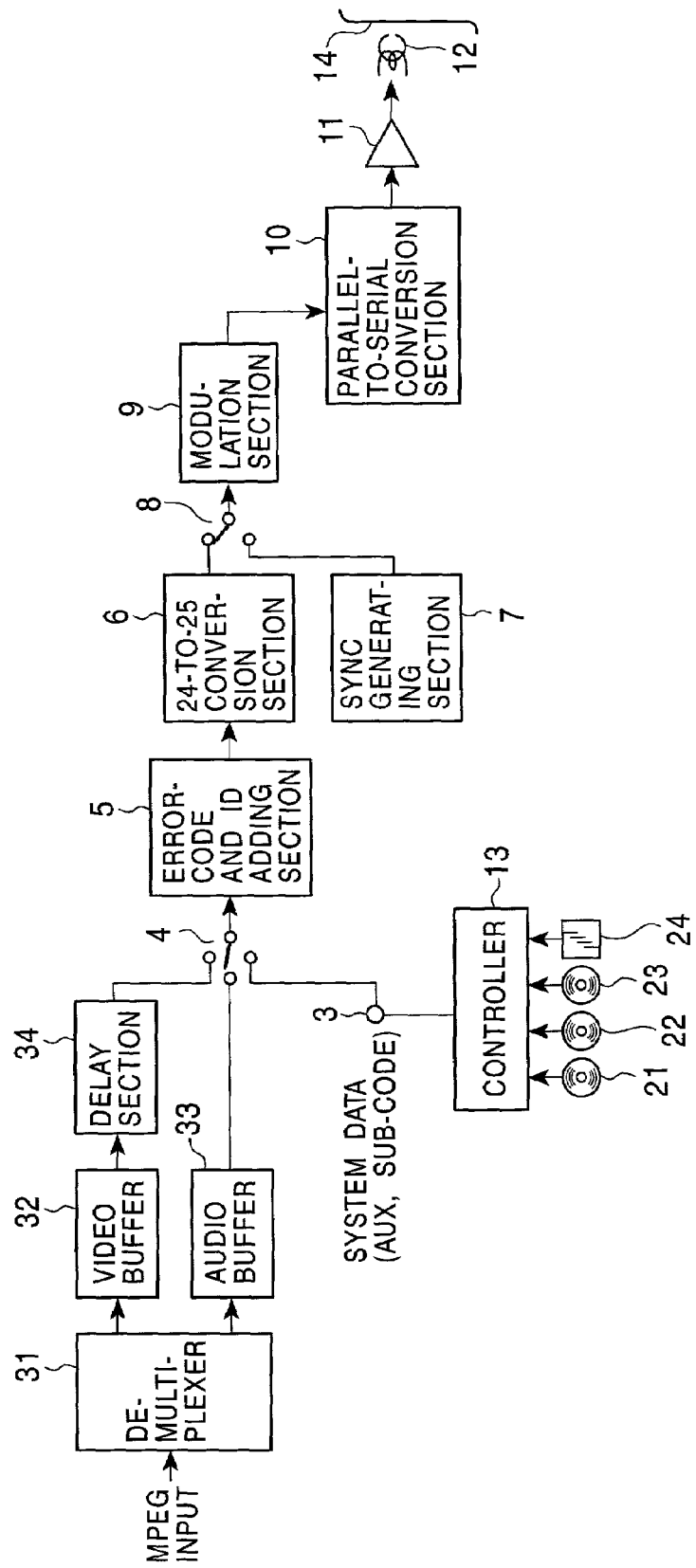
FIG. 17 is a block diagram showing another example structure of the recording system of the magnetic-tape recording and reproduction apparatus to which the present invention is applied.

FIG. 17 shows an example structure of a recording system in a magnetic-tape recording and reproduction apparatus to which the present invention is applied, used when an HD video signal and an HD audio signal compressed by an MPEG method are input.

The recording system includes a demultiplexer 31, a video buffer 32, an audio buffer 33, and a delay section 34 in stead of the video-data compression section 1 and the audio-data compression section 2 used in the case shown in FIG. 1.

The demultiplexer 31 applies demultiplexing processing to input MPEG data, sends resultant video data to the video buffer 32, and sends audio data to the audio buffer 33.

When the MPEG data shown in FIG. 16(A) is input, for example, the I picture $I_{n+2}$, the B picture $B_n$, . . . are sent to the video buffer 32, and the audio data $A_{n+2}$, the audio data $A_n$, . . . are sent to the audio buffer 33.

The video buffer 32 holds predetermined-unit video data sent from the demultiplexer 31, and sends it to the delay section 34. In the case shown in FIG. 16(A), the video buffer 32 holds video data in units of three pictures (for example, the I picture $I_{n+2}$, the B picture $B_n$, and the B picture $B_{n+1}$), the number of which is indicated by the value of M in the GOP structure, and sends them to the delay section 34.

The audio buffer 33 holds a predetermined-unit HD audio signal sent from the demultiplexer 31, and sends it to a switch 4. In the case shown in FIG. 16(A), the audio buffer 33 holds one-unit audio data (for example, the audio data $A_{n+2}$, $A_n$, $A_{n+1}$) corresponding to three pictures.

The delay section 34 stores (delays) video data sent from the video buffer 32 for a predetermined time.

The switch 4 is switched by the controller 13 to select the video data output from the delay section 34, the audio data output from the audio buffer 33, or system data input from a terminal 3, at a predetermined timing and to send it to an error-code and ID adding section 5 to synthesize data.

As a result, as shown in FIG. 12, data is formed such that audio data and video data are arranged in units of pictures (three pictures in the case shown in FIG. 12) whose number is indicated by the value of M in a GOP structure.

Since the error-code and ID adding section 5 to an amplifier 11 perform the same processes as those described in the case shown in FIG. 1, a description thereof is omitted.

Figure 18:
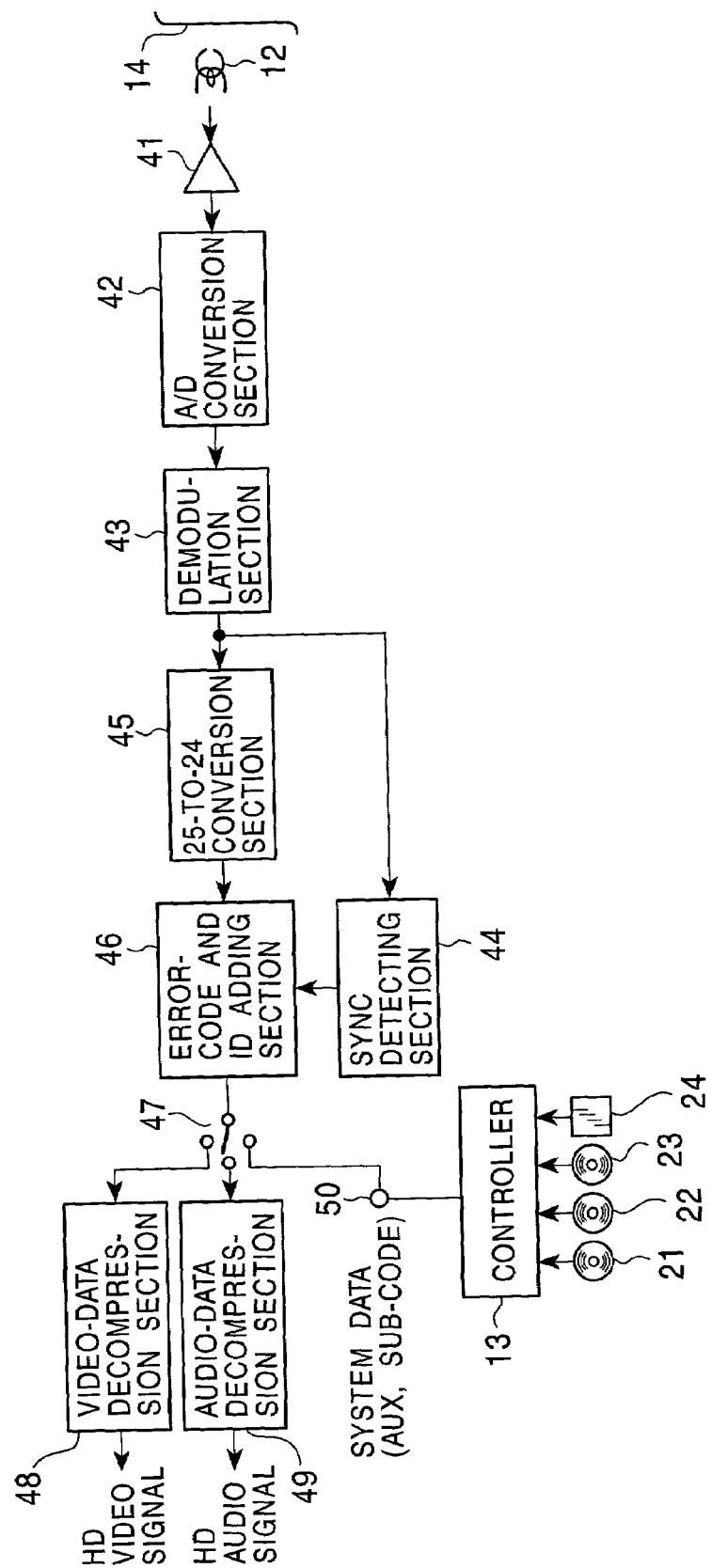
FIG. 18 is a block diagram showing an example structure of a reproduction system of the magnetic-tape recording and reproduction apparatus to which the present invention is applied.

FIG. 18 shows an example structure of a reproduction system for reproducing data recorded into the magnetic tape 14 as described above.

The rotating head 12 reads data recorded into the magnetic tape 14, and outputs it to an amplifier 41. The amplifier 41 amplifies an input signal, and sends it to an A/D conversion section 42. The A/D conversion section 42 converts an input signal from an analog signal to a digital signal, and sends it to a demodulation section 43. The demodulation section 43 randomizes data sent from the A/D conversion section 42 correspondingly to the randomization performed by the modulation section 9, and achieves demodulation by the method corresponding to the modulation method used by the modulation section 9.

A sync detecting section 44 detects from data demodulated by the demodulation section 43 a sync (synchronizing data) in each sync block of the main sector shown in FIG. 8 and a sync in each sub-code sync block in the sub-code sector shown in FIG. 9, and sends them to an error-correcting and ID-detecting section 46. A 25-to-24 conversion section 45 converts data sent from the demodulation section 43 from 25-bit data to 24-bit data correspondingly to the conversion performed by the 24-to-25 conversion section 6, and outputs the data to the error-correcting and ID-detecting section 46.

The error-correcting and ID-detecting section 46 executes error-correcting processing, ID detecting processing, and deinterleaving processing by using syncs input from the sync detecting section 44.

A switch 47 is controlled by the controller 13 to output video data (including search video data) to output a video-data decompression section 48, audio data to an audio-data decompression section 49, and system data, such as sub-code data and AUX data, to the controller 13 through a terminal 50 among data output from the error-correcting and ID-detecting section 46.

The video-data decompression section 48 decompresses input video data, apply D/A conversion, and outputs as an analog HD video signal. The audio-data decompression section 49 decompresses input audio data, apply D/A conversion, and outputs as an analog audio data.

The operation of the reproduction system will be described next. The rotating head 12 reads data recorded into the magnetic tape 14 in the form shown in FIG. 13, and the amplifier 41 amplifies it and sends it to the A/D conversion section 42. The A/D conversion section 42 converts an input analog signal to a digital signal, and sends it to the demodulation section 43. The demodulation section 43 randomizes and demodulates data by the method corresponding to the randomization and the modulation method used by the modulation section 9 shown in FIG. 1.

The 25-to-24 conversion section 45 converts data demodulated by the demodulation section 43 from 25-bit data to 24-bit data, and outputs the data to the error-correcting and ID-detecting section 46.

The sync detecting section 44 detects from data output from the demodulation section 43 sync's in the main sector shown in FIG. 8 or sync's in the sub-code sector shown in FIG. 9, and sends them to the error-correcting and ID-detecting section 46. The error-correcting and ID-detecting section 46 stores data for 16 tracks, applies deinterleaving, and achieves error-correcting processing with the use of the parities C1 and C2 of the main sector shown in FIG. 8. The error-correcting and ID-detecting section 46 also detects an SB header in the main sector to determine whether data included in each sync block is audio data, video data, AUX data, or search video data.

In addition, the error-correcting and ID-detecting section 46 uses the parity of the sub-code sector shown in FIG. 9 to apply error-correcting processing to sub-code data, and detects an ID to determine the type of the sub-code data. With this operation, it is determined whether the sub-code data indicates a track number or a time-code number.

The switch 47 sends video data and search video data to the video-data decompression section 48 according to the SB header detected by the error-correcting and ID-detecting section 46. The video-data decompression section 48 decompresses input data by the method corresponding to the compression method used by the video-data compression section 1 shown in FIG. 1, and outputs as a video signal.

The switch 47 outputs audio data to the audio-data decompression section 49. The audio-data decompression section 49 decompresses input audio data by the method corresponding to the compression method used by the audio-data compression section 2 shown in FIG. 1, and outputs as an audio signal.

The switch 47 outputs AUX data and sub-code data output from the error-correcting and ID-detecting section 46 to the controller 13 through the terminal 50.

As a result, pictures and audio data in data recorded as shown in FIG. 13, for example, are decompressed correspondingly to a normal data arrangement of MPEG data shown in FIG. 16(A).

In the foregoing description, pictures and audio data recorded into the magnetic tape 14 are decompressed. They may be multiplexed to form MPEG data.

Figure 19:
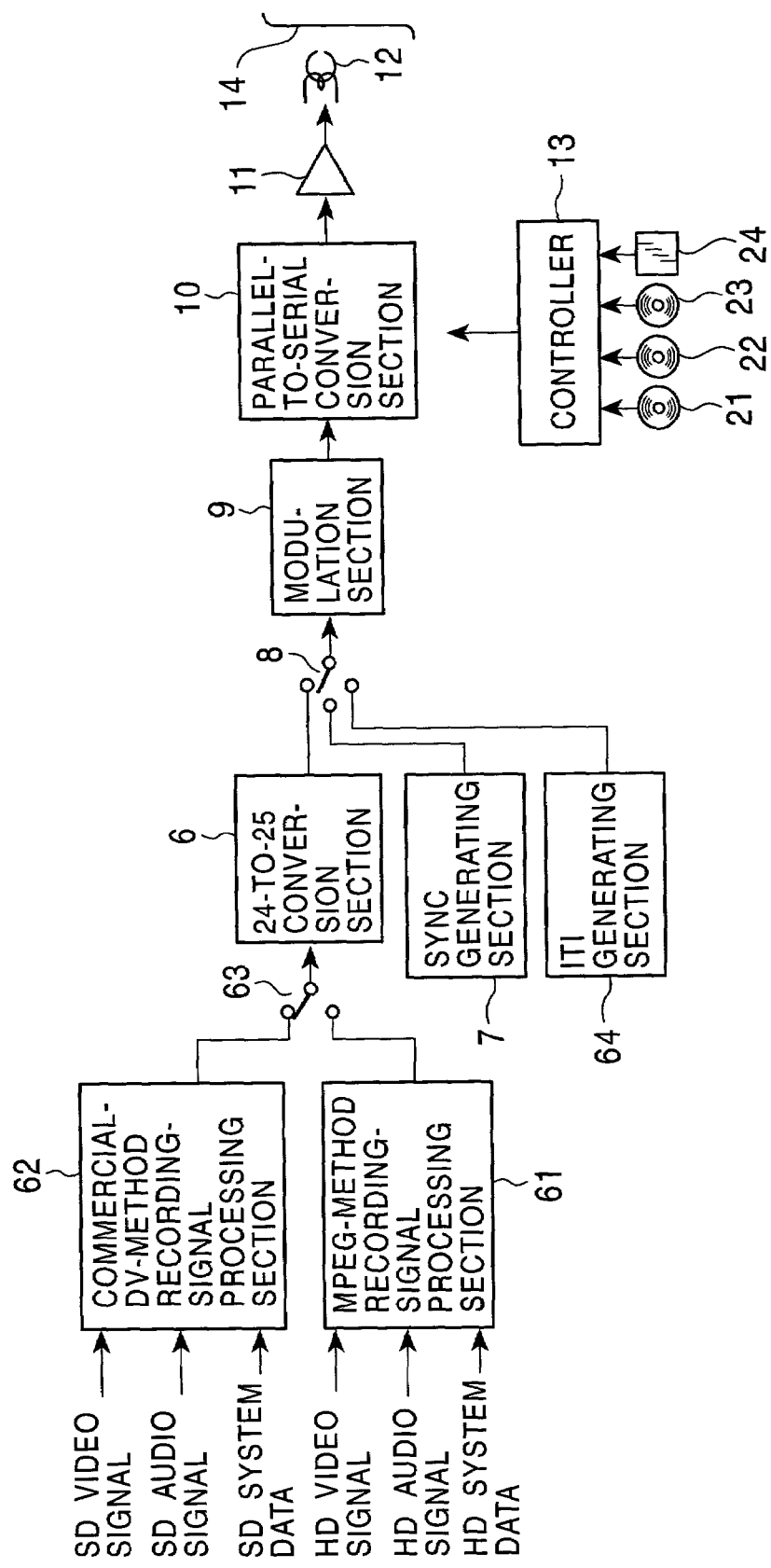
FIG. 19 is a block diagram showing still another example structure of the recording system of the magnetic-tape recording and reproduction apparatus to which the present invention is applied.

FIG. 19 shows a recording system according to another embodiment. In this embodiment, an HD video signal, the corresponding audio signal (HD audio signal), and system data (HD system data) can be recorded into a magnetic tape 14 by an MPEG method in the same way as in the case shown in FIG. 1. In addition, a standard-quality video signal (standard-density (SD) video signal), an SD audio signal, and SD system data can also be recorded by the same commercial DV format as that conventionally used.

More specifically, in the embodiment shown in FIG. 19, a commercial-DV-method recording-signal processing section 62 for processing an SD video signal, an SD audio signal, and SD system data is provided in addition to an MPEG-method recording-signal processing section 61 which includes the video-data compression section 1, the audio-data compression section 2, the terminal 3, the switch 4, and the error-correcting and ID adding section 5. A switch 63 is controlled by a controller 13 to select the output of the MPEG-method recording-signal processing section 61 or the output of the commercial-DV-method recording-signal processing section 62, and sends to a 24-to-25 conversion section 6.

In the embodiment shown in FIG. 19, an ITI generating section 64 is further provided. The ITI generating section 64 generates data for an insert-and-track-information (ITI) sector to be disposed in the conventional track shown in FIG. 14, and sends it to a switch 8. The switch 8 selects the output of the 24-to-25 conversion section 6, the output of a sync generating section 7, or the output of the ITI generating section 64, and outputs to a modulation section 9. The other portions are the same as those used in the case shown in FIG. 1.

In the present embodiment, an HD video signal, the corresponding HD audio signal, and HD system data are recorded (since the operation is the same as that in the case shown in FIG. 1, a description thereof is omitted) into a magnetic tape 14 in the same way as in the embodiment shown in FIG. 1. In addition, the commercial-DV-method recording-signal processing section 62 applies signal processing to an input SD video signal, the corresponding SD audio signal, and SD system data, in the DV format.

Data output from the commercial-DV-method recording-signal processing section 62 is sent to the 24-to-25 conversion section 6 through the switch 63, and is converted from 24-bit data to 25-bit data. The switch 8 selects the data output from the 24-to-25 conversion section 6, a sync or an amble output from the sync generating section 7, or data (data in the ITI sector shown in FIG. 14) output from the ITI generating section 64, at a predetermined timing, and outputs to a modulation section 9. The modulation section 9 modulates input data and outputs to a parallel-to-serial conversion section 10. The parallel-to-serial conversion section 10 converts parallel data to serial data. The data output from the parallel-to-serial conversion section 10 is amplified by an amplifier 11, and recorded into the magnetic tape 14 by a rotating head 12.

As described above, data is recorded into the magnetic tape 14 with tracks having the DV format shown in FIG. 14.

The error-code and ID adding section 5 shown in FIG. 1, built in the MPEG-method recording-signal processing section 61 records identification information indicating that data currently being recorded is data compressed by the MPEG method, into the ID of the main sector shown in FIG. 8 and the ID of the sub-code sector shown in FIG. 9.

As the commercial-DV-method recording-signal processing section 62, the 24-to-25 conversion section 6, the ITI generating section 64, the switch 8, the modulation section 9, the parallel-to-serial conversion section 10, the amplifier 11, and the rotating head 12 shown in FIG. 19, the same circuit devices as those used in the conventional commercial DV method can be used. Among them, the 24-to-25 conversion section 6, the switch 8, the modulation section 9, the parallel-to-serial conversion section 10, the amplifier 11, and the rotating head 12 are used both for recording an SD video signal and for recording an HD video signal.

Figure 20:
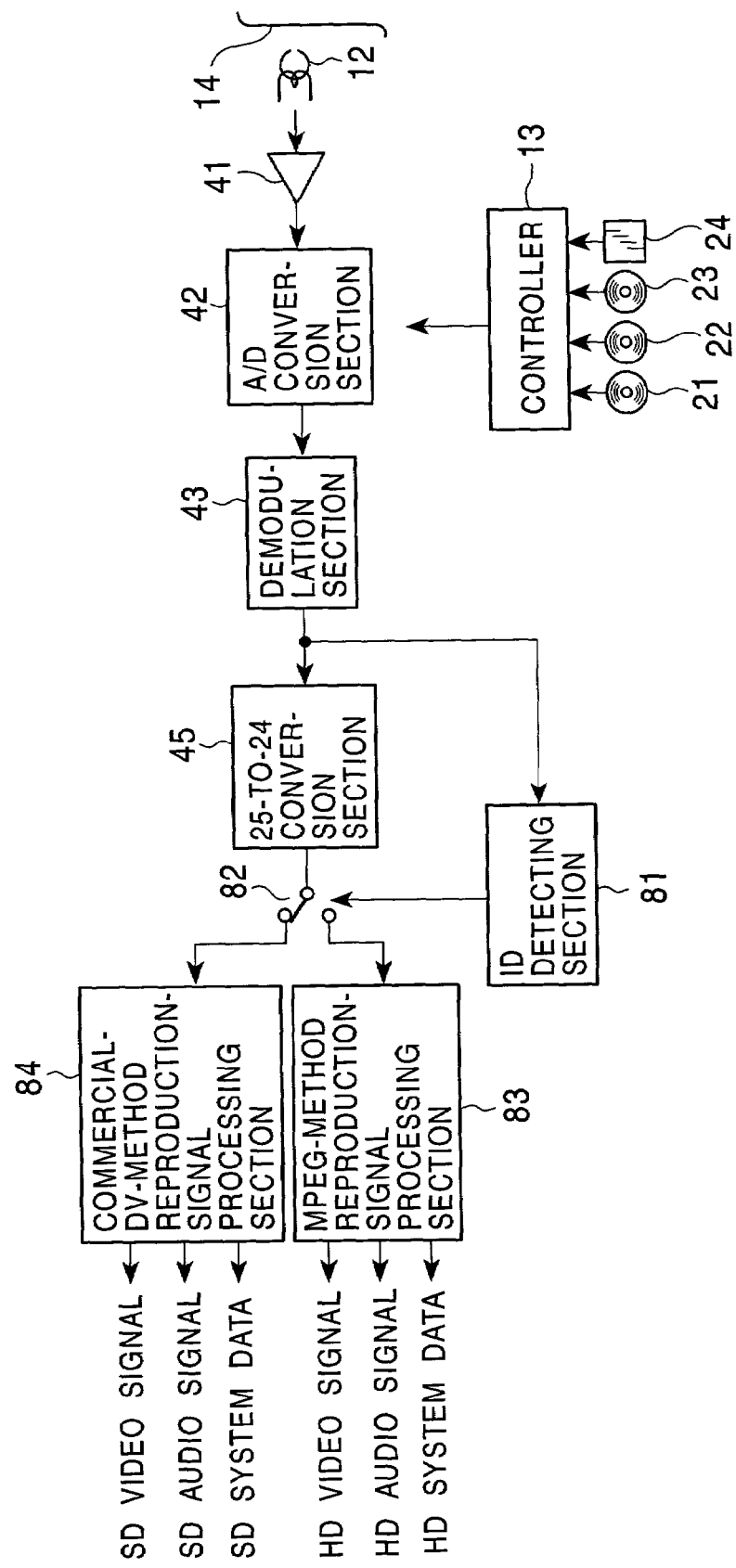
FIG. 20 is a block diagram showing another example structure of the reproduction system of the magnetic-tape recording and reproduction apparatus to which the present invention is applied.

FIG. 20 shows an example structure of a reproduction system corresponding to the recording system shown in FIG. 19. In this example structure, an ID detecting section 81 determines from the ID in the main sector shown in FIG. 8 or the ID in the sub-code sector shown in FIG. 9, included in the output of a demodulation section 43, that data being reproduced is the data of an HD video signal compressed by the MPEG method. The ID detecting section 81 also detects APT2, APT1, and APT0 recorded in a track information area (TIA) of an ITI sector shown in FIG. 21. As shown in FIG. 21, APT2, APT1, and APT0 are set to all zero for a consumer digital video cassette recorder. Therefore, from the values, it can be identified whether data being reproduced is the data of an SD video signal having the commercial DV method.

When it is determined that data being reproduced is the data of an HD video signal, the ID detecting section 81 switches a switch 82 to an MPEG-method reproduction-signal processing section 83 to send data output from a 25-to-24 conversion section 45 to the MPEG-method reproduction-signal processing section 83. When it is determined that data being reproduced is the data of an SD video signal in the commercial DV method, the switch 82 is switched to the upper side in FIG. 20 to send data output from the 25-to-24 conversion section 45 to a commercial-DV-method reproduction-signal processing section 84.

The MPEG-method reproduction-signal processing section 83 includes the sync detecting section 44, the error-correcting and ID-detecting section 46, the switch 47, the video-data decompression section 48, the audio-data decompression section 49, and the terminal 50 shown in FIG. 18.

The other circuit devices are the same as in the case shown in FIG. 18.

More specifically, in the embodiment shown in FIG. 20, the ID detecting section 81 determines from data output from a demodulation section 43 whether reproduction data is MPEG-method data (data of an HD video signal) or commercial-DV-method data (data of an SD video signal). When it is determined that reproduction data is MPEG-method data, data output from the 25-to-24 conversion section 35 is sent to the MPEG-method reproduction-signal processing section 83 through the switch 82 and processed. In this case, the same processing as that performed in the case shown in FIG. 18 is applied.

When the ID detecting section 81 determines that data output from the demodulation section 43 is data having the commercial-DV-method format, the ID detecting section 81 switches the switch 82 to send the output of the 25-to-24 conversion section to the commercial-DV-method reproduction-signal processing section 84. The commercial-DV-method reproduction-signal processing section 84 decompresses input data by the DV-format method, and outputs as an SD video signal, an SD audio signal, and SD system data.

In the structure shown in FIG. 20, a rotating head 12, an amplifier 41, an A/D conversion section 42, the demodulation section 43, and the 25-to-24 conversion section 45 are used both for reproducing an SD video signal and for reproducing an HD video signal.

The above-described series of processing can be executed by software as well as by hardware. When the series of processing is achieved by software, a program constituting the software is installed from a recording medium to a computer built in a special hardware, or to a unit which can execute various functions after various programs are installed therein, such as a general-purpose personal computer.

The recording medium can be a package medium which stores the program and is distributed for providing the users with the program, separately from a magnetic-tape recording and reproduction apparatus, as shown in FIG. 1, FIG. 17, and FIG. 20, such as a magnetic disk 21 (including a floppy disk), an optical disk 22 (including a compact disk-read only memory (CD-ROM) and a digital versatile disk (DVD)), a magneto-optical disk 23 (including a Mini-disk (MD)), or a semiconductor memory 24. The recording medium can also be a device which stores the program and is provided for the users in a state in which it is built in an apparatus in advance, such as a ROM or a hard disk.

In the present specification, steps describing the program stored in a recording medium include processes performed in a time sequential manner in the order in which they are described, and in addition, include processes which are not necessarily performed in a time sequential manner but executed in parallel or independently.

According to a magnetic-tape recording apparatus, a magnetic-tape recording method, and a program stored in a recording medium of the present invention, predetermined-unit video data is taken, audio data corresponding to the predetermined-unit video data is taken, and the predetermined-unit video data and the audio data corresponding to the predetermined-unit video data are synthesized such that they are continuous on a track in a magnetic tape without any space disposed therebetween and sent for recording on the magnetic tape. Therefore, a large amount of data, typical of which is the data of an HD video signal, can be recorded on the magnetic tape in a digital manner, and tying processing can be efficiently applied to video signals.

According to a magnetic-tape reproduction apparatus, a magnetic-tape reproduction method, and a program stored in a recording medium of the present invention, compressed high-quality video data included in data reproduced by a rotating head from a magnetic tape is decompressed, compressed audio data included in the data reproduced by the rotating head from the magnetic tape is decompressed, distinguish information for distinguishing the video data from the audio data is detected from the data reproduced by the rotating head from the magnetic tape, and the data reproduced from the magnetic tape is processed according to the result of detection. Therefore, high-quality video data as well as standard-quality video data can be positively read.

What is claimed is:

1. A magnetic-tape recording apparatus for recording digital data on a magnetic tape by a rotating head, comprising:
   first obtaining means for obtaining predetermined-unit video data, which includes a predetermined unit of pictures;
   second obtaining means for obtaining audio data corresponding to the predetermined-unit video data;
   synthesizing means for recording the predetermined unit of pictures and the corresponding audio data as one group on the magnetic tape such that said predetermined unit of pictures and the corresponding audio data are continuous on a track in the magnetic tape without any space disposed therebetween,
      wherein said one group of the predetermined unit of pictures and said corresponding audio data is recorded on a common main sector in a track, said track including an error correction code, said common main sector including an SB header and main data, said main data including at least said predetermined unit of pictures and said corresponding audio data, and said SB header including identification information for identifying a type of said main data,
      wherein said one group of the predetermined unit of pictures and said corresponding audio data is recorded in a predetermined number of tracks interleaved in said error correction code, and
      wherein the predetermined unit of pictures includes three pictures; and
   sending means for sending data synthesized by the synthesizing means to the rotating head in order to record the data on the magnetic tape.

2. A magnetic-tape recording apparatus according to claim 1, further comprising
   compression means for compressing the high-quality video data obtained by the first obtaining means,
   wherein the first obtaining means obtains, as the video data, high-quality video data; and
   the predetermined-unit video data is the data of pictures whose number is indicated by the value of M in a GOP structure.

3. A magnetic-tape recording apparatus according to claim 2, wherein the compression means compresses the high-quality video data by an MP@HL or MP@H-14 method.

4. A magnetic-tape recording apparatus according to claim 2, further comprising
   third obtaining means for obtaining, as the video data, compressed standard video data,
   wherein the high-quality video data obtained by the first obtaining means includes distinguish information for distinguishing the high-quality video data from the standard video data; and
   the synthesizing means selects the high-quality video data compressed by the compression means or the compressed standard video data obtained by the third obtaining means and synthesizes.

5. A magnetic-tape recording method for a magnetic-tape recording apparatus for recording digital data on a magnetic tape by a rotating head, comprising:
   a first obtaining step of obtaining predetermined-unit video data;
   a second obtaining step of obtaining audio data corresponding to the predetermined-unit video data, which includes a predetermined unit of pictures;
   a synthesizing step of recording the predetermined unit of pictures and the corresponding audio data as one group on the magnetic tape such that said predetermined unit of pictures and the corresponding audio data are continuous on a track in the magnetic tape without any space disposed therebetween,
      wherein said one group of the predetermined unit of pictures and said corresponding audio data is recorded on a common main sector in a track, said track including an error correction code, said common main sector including an SB header and main data, said main data including at least said predetermined unit of pictures and said corresponding audio data, and said SB header including identification information for identifying a type of said main data,
      wherein said one group of the predetermined unit of pictures and said corresponding audio data is recorded in a predetermined number of tracks interleaved in said error correction code, and
      wherein the predetermined unit of pictures includes three pictures; and
   a sending step of sending data synthesized by a process in the synthesizing step to the rotating head in order to record the data on the magnetic tape.

6. A recording medium for recording a computer-readable program, executed by a computer, which controls a magnetic-tape recording apparatus for recording digital data on a magnetic tape by a rotating head, the program comprising:
   a first obtaining step of obtaining predetermined-unit video data;
   a second obtaining step of obtaining audio data corresponding to the predetermined-unit video data, which includes a predetermined unit of pictures;
   a synthesizing step of recording the predetermined unit of pictures and the corresponding audio data as one group on the magnetic tape such that said predetermined unit of pictures and the corresponding audio data are continuous on a track in the magnetic tape without any space disposed therebetween,
      wherein said one group of the predetermined unit of pictures and said corresponding audio data is recorded on a common main sector in a track, said track including an error correction code, said common main sector including an SB header and main data, said main data including at least said predetermined unit of pictures and said corresponding audio data, and said SB header including identification information for identifying a type of said main data,
      wherein said one group of the predetermined unit of pictures and said corresponding audio data is recorded in a predetermined number of tracks interleaved in said error correction code, and
      wherein the predetermined unit of pictures includes three pictures; and
   a sending step of sending data synthesized by a process in the synthesizing step to the rotating head in order to record the data on the magnetic tape.

7. A magnetic-tape reproduction apparatus for reading by a rotating head a magnetic tape into which a compressed, high-quality or standard, predetermined unit of pictures and corresponding audio data are recorded as one group on the magnetic tape such that said predetermined unit of pictures and the corresponding audio data are continuous on a track without any space disposed therebetween, comprising:

first decompression means for decompressing the compressed, high-quality predetermined unit of pictures read from the magnetic tape by the rotating head;

second decompression means for decompressing the compressed corresponding audio data among the data read from the magnetic tape by the rotating head;

detecting means for detecting distinguish information for distinguishing the predetermined unit of pictures from the audio data, from the data read from the magnetic tape by the rotating head; and selection means for selecting the first decompression means or the second decompression means according to the result of detection performed by the detecting means to process the data read from the magnetic tape by the rotating head, wherein said predetermined unit of pictures and said corresponding audio data is recorded on a common main sector in a track, said track including an error correction code, said common main sector including an SB header and main data, said main data including at least said predetermined unit of pictures and said corresponding audio data, and said SB header including identification information for identifying a type of said main data, wherein said one group of the predetermined unit of pictures and said corresponding audio data is recorded in a predetermined number of tracks interleaved in said error correction code, and wherein the predetermined unit of pictures includes three pictures.

8. A magnetic-tape reproduction apparatus according to claim 7, wherein the first decompression means decompresses the high-quality video data by an MP@HL or MP@H-14 method.

9. A magnetic-tape reproduction method for a magnetic-tape reproduction apparatus for reading by a rotating head a magnetic tape into which compressed, high-quality or standard, predetermined unit of pictures and corresponding audio data are recorded as one group on the magnetic tape such that said predetermined unit of pictures and the corresponding audio data are continuous on a track without any space disposed therebetween, comprising:

a first decompression step of decompressing the compressed, high-quality predetermined unit of pictures read from the magnetic tape by the rotating head;

a second decompression step of decompressing the compressed corresponding audio data among the data read from the magnetic tape by the rotating head;

a detecting step of detecting distinguish information for distinguishing the predetermined unit of pictures from the audio data, from the data read from the magnetic tape by the rotating head; and a selection step of selecting a process performed in the first decompression step or in the second decompression step according to the result of detection performed in the detecting step to process the data read from the magnetic tape by the rotating head, wherein said predetermined unit of pictures and said corresponding audio data is recorded on a common main sector in a track, said track including an error correction code, said common main sector including an SB header and main data, said main data including at least said predetermined unit of pictures and said corresponding audio data, and said SB header including identification information for identifying a type of said main data, wherein said one group of the predetermined unit of pictures and said corresponding audio data is recorded in a predetermined number of tracks interleaved in said error correction code, and wherein the predetermined unit of pictures includes three pictures.

10. A recording medium for recording a computer-readable program, executed by a computer, which controls a magnetic-tape reproduction apparatus for reading by a rotating head a magnetic tape into which compressed, high-quality or standard, predetermined unit of pictures and corresponding audio data are recorded as one group on the magnetic tape such that said predetermined unit of pictures and the corresponding audio data are continuous on a track without any space disposed therebetween, comprising:

a first decompression step of decompressing the compressed, high-quality predetermined unit of pictures read from the magnetic tape by the rotating head;

a second decompression step of decompressing the compressed corresponding audio data among the data read from the magnetic tape by the rotating head;

a detecting step of detecting distinguish information for distinguishing the predetermined unit of pictures from the audio data among the data read from the magnetic tape by the rotating head; and a selection step of selecting a process performed in the first decompression step or in the second decompression step according to the result of detection performed in the detecting step to process the data read from the magnetic tape by the rotating head, wherein said predetermined unit of pictures and said corresponding audio data is recorded on a common main sector in a track, said track including an error correction code, said common main sector including an SB header and main data, said main data including at least said predetermined unit of pictures and said corresponding audio data, and said SB header including identification information for identifying a type of said main data, wherein said one group of the predetermined unit of pictures and said corresponding audio data is recorded in a predetermined number of tracks interleaved in said error correction code, and wherein the predetermined unit of pictures includes three pictures.

11. A magnetic-tape recording apparatus for recording digital data on a magnetic tape by a rotating head, comprising:

first obtaining means for obtaining predetermined-unit video data, which includes a predetermined unit of pictures;

second obtaining means for obtaining audio data corresponding to the predetermined-unit video data;

synthesizing means for recording the predetermined unit of pictures and the corresponding audio data as one group on the magnetic tape such that said predetermined unit of pictures and the corresponding audio data are continuous on a track in the magnetic tape without any space disposed therebetween, wherein said one group of the predetermined unit of pictures and said corresponding audio data is recorded on a common main sector in a track, said track including an error correction code, said common main sector including an SB header and main data, said main data including at least said predetermined unit of pictures and said corresponding audio data, and said SB header including identification information for identifying a type of said main data, wherein said one group of the predetermined unit of pictures and said corresponding audio data is recorded in a predetermined number of tracks interleaved in said error correction code, and wherein the predetermined number of tracks includes sixteen tracks; and sending means for sending data synthesized by the synthesizing means to the rotating head in order to record the data on the magnetic tape.

12. A magnetic-tape recording method for a magnetic-tape recording apparatus for recording digital data on a magnetic tape by a rotating head, comprising:

a first obtaining step of obtaining predetermined-unit video data;

a second obtaining step of obtaining audio data corresponding to the predetermined-unit video data, which includes a predetermined unit of pictures;

a synthesizing step of recording the predetermined unit of pictures and the corresponding audio data as one group on the magnetic tape such that said predetermined unit of pictures and the corresponding audio data are continuous on a track in the magnetic tape without any space disposed therebetween, wherein said one group of the predetermined unit of pictures and said corresponding audio data is recorded on a common main sector in a track, said track including an error correction code, said common main sector including an SB header and main data, said main data including at least said predetermined unit of pictures and said corresponding audio data, and said SB header including identification information for identifying a type of said main data, wherein said one group of the predetermined unit of pictures and said corresponding audio data is recorded in a predetermined number of tracks interleaved in said error correction code, and wherein the predetermined number of tracks includes sixteen tracks; and a sending step of sending data synthesized by a process in the synthesizing step to the rotating head in order to record the data on the magnetic tape.

13. A recording medium for recording a computer-readable program, executed by a computer, which controls a magnetic-tape recording apparatus for recording digital data on a magnetic tape by a rotating head, the program comprising:

a first obtaining step of obtaining predetermined-unit video data;

a second obtaining step of obtaining audio data corresponding to the predetermined-unit video data, which includes a predetermined unit of pictures;

a synthesizing step of recording the predetermined unit of pictures and the corresponding audio data as one group on the magnetic tape such that said predetermined unit of pictures and the corresponding audio data are continuous on a track in the magnetic tape without any space disposed therebetween, wherein said one group of the predetermined unit of pictures and said corresponding audio data is recorded on a common main sector in a track, said track including an error correction code, said common main sector including an SB header and main data, said main data including at least said predetermined unit of pictures and said corresponding audio data, and said SB header including identification information for identifying a type of said main data, wherein said one group of the predetermined unit of pictures and said corresponding audio data is recorded in a predetermined number of tracks interleaved in said error correction code, and wherein the predetermined number of tracks includes sixteen tracks; and a sending step of sending data synthesized by a process in the synthesizing step to the rotating head in order to record the data on the magnetic tape.

14. A magnetic-tape reproduction apparatus for reading by a rotating head a magnetic tape into which a compressed, high-quality or standard, predetermined unit of pictures and corresponding audio data are recorded as one group on the magnetic tape such that said predetermined unit of pictures and the corresponding audio data are continuous on a track without any space disposed therebetween, comprising:

first decompression means for decompressing the compressed, high-quality predetermined unit of pictures read from the magnetic tape by the rotating head;

second decompression means for decompressing the compressed corresponding audio data among the data read from the magnetic tape by the rotating head;

detecting means for detecting distinguish information for distinguishing the predetermined unit of pictures from the audio data, from the data read from the magnetic tape by the rotating head; and selection means for selecting the first decompression means or the second decompression means according to the result of detection performed by the detecting means to process the data read from the magnetic tape by the rotating head, wherein said predetermined unit of pictures and said corresponding audio data is recorded on a common main sector in a track, said track including an error correction code, said common main sector including an SB header and main data, said main data including at least said predetermined unit of pictures and said corresponding audio data, and said SB header including identification information for identifying a type of said main data, wherein said one group of the predetermined unit of pictures and said corresponding audio data is recorded in a predetermined number of tracks interleaved in said error correction code, and wherein the predetermined number of tracks includes sixteen tracks.

15. A magnetic-tape reproduction method for a magnetic-tape reproduction apparatus for reading by a rotating head a magnetic tape into which compressed, high-quality or standard, predetermined unit of pictures and corresponding audio data are recorded as one group on the magnetic tape such that said predetermined unit of pictures and the corresponding audio data are continuous on a track without any space disposed therebetween, compnsing:

a first decompression step of decompressing the compressed, high-quality predetermined unit of pictures read from the magnetic tape by the rotating head;

a second decompression step of decompressing the compressed corresponding audio data among the data read from the magnetic tape by the rotating head;

a detecting step of detecting distinguish information for distinguishing the predetermined unit of pictures from the audio data, from the data read from the magnetic tape by the rotating head; and a selection step of selecting a process performed in the first decompression step or in the second decompression step according to the result of detection performed in the detecting step to process the data read from the magnetic tape by the rotating head, wherein said predetermined unit of pictures and said corresponding audio data is recorded on a common main sector in a track, said track including an error correction code, said common main sector including an SB header and main data, said main data including at least said predetermined unit of pictures and said corresponding audio data, and said SB header including identification information for identifying a type of said main data, wherein said one group of the predetermined unit of pictures and said corresponding audio data is recorded in a predetermined number of tracks interleaved in said error correction code, and wherein the predetermined number of tracks includes sixteen tracks.

16. A recording medium for recording a computer-readable program, executed by a computer, which controls a magnetic-tape reproduction apparatus for reading by a rotating head a magnetic tape into which compressed, high-quality or standard, predetermined unit of pictures and corresponding audio data are recorded as one group on the magnetic tape such that said predetermined unit of pictures and the corresponding audio data are continuous on a track without any space disposed therebetween, comprising:

a first decompression step of decompressing the compressed, high-quality predetermined unit of pictures read from the magnetic tape by the rotating head;

a second decompression step of decompressing the compressed corresponding audio data among the data read from the magnetic tape by the rotating head;

a detecting step of detecting distinguish information for distinguishing the predetermined unit of pictures from the audio data among the data read from the magnetic tape by the rotating head; and a selection step of selecting a process performed in the first decompression step or in the second decompression step according to the result of detection performed in the detecting step to process the data read from the magnetic tape by the rotating head, wherein said predetermined unit of pictures and said corresponding audio data is recorded on a common main sector in a track, said track including an error correction code, said common main sector including an SB header and main data, said main data including at least said predetermined unit of pictures and said corresponding audio data, and said SB header including identification information for identifying a type of said main data, wherein said one group of the predetermined unit of pictures and said corresponding audio data is recorded in a predetermined number of tracks interleaved in said error correction code, and wherein the predetermined number of tracks includes sixteen tracks.

* * * * *